(12) United States Patent
Li et al.

(10) Patent No.: US 12,484,088 B2
(45) Date of Patent: Nov. 25, 2025

(54) RESOURCE ALLOCATION FOR CHANNEL OCCUPANCY TIME SHARING IN MODE TWO SIDELINK COMMUNICATION

(71) Applicant: QUALCOMM Incorporated, San Diego, CA (US)

(72) Inventors: Qing Li, Princeton Junction, NJ (US); Junyi Li, Fairless Hills, PA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 780 days.

(21) Appl. No.: 17/807,045

(22) Filed: Jun. 15, 2022

(65) Prior Publication Data

US 2023/0413325 A1    Dec. 21, 2023

(51) Int. Cl.
| | |
|---|---|
| *H04W 74/08* | (2024.01) |
| *H04L 5/00* | (2006.01) |
| *H04W 28/26* | (2009.01) |
| *H04W 72/04* | (2023.01) |
| *H04W 72/0446* | (2023.01) |
| *H04W 74/00* | (2009.01) |
| *H04W 74/0816* | (2024.01) |

(52) U.S. Cl.
CPC ....... *H04W 74/0816* (2013.01); *H04L 5/0053* (2013.01); *H04W 28/26* (2013.01); *H04W 72/0446* (2013.01); *H04W 74/002* (2013.01); *H04W 74/0866* (2013.01)

(58) Field of Classification Search
CPC ........... H04W 74/0816; H04W 74/002; H04W 74/0866; H04W 72/0446; H04L 5/0053
See application file for complete search history.

(56) References Cited

U.S. PATENT DOCUMENTS

| | | | |
|---|---|---|---|
| 11,483,864 B2 * | 10/2022 | Xue | ............... H04W 74/002 |
| 2021/0092783 A1 | 3/2021 | Sun et al. | |
| 2022/0095117 A1 | 3/2022 | Liu et al. | |

FOREIGN PATENT DOCUMENTS

WO    2021255673 A1    12/2021

OTHER PUBLICATIONS

Huawei, et al., "Channel Access Mechanism and Resource Allocation for Sidelink Operation over Unlicensed Spectrum", 3GPP TSG-RAN WG1 Meeting #109-e, R1-2203146, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 13 Pages, XP052143964, section 3, p. 2-p. 3.

(Continued)

*Primary Examiner* — Melvin C Marcelo
(74) *Attorney, Agent, or Firm* — Harrity & Harrity LLP

(57) ABSTRACT

Wireless communications systems, apparatuses, and methods are provided. A method of wireless communication performed by a first sidelink user equipment (UE) may include performing a first listen-before-talk (LBT) procedure, transmitting, to a second sidelink UE based on the first LBT procedure being successful, at least one of a resource indicator indicating resources associated with a sidelink communication, wherein the resources are indicated relative to when the first LBT procedure is successful or a channel occupancy time (COT) indicator associated with COT sharing.

30 Claims, 10 Drawing Sheets

(56) References Cited

OTHER PUBLICATIONS

International Search Report and Written Opinion—PCT/US2023/022483—ISA/EPO—Sep. 6, 2023.
Lenovo: "Channel Access Mechanism for Sidelink on FR1 Unlicensed Spectrum", 3GPP TSG RAN WG1 #109-e, R1-2203703, 3rd Generation Partnership Project, Mobile Competence Centre, 650, Route Des Lucioles, F-06921 Sophia-Antipolis Cedex, France vol. RAN WG1, No. e-Meeting, May 9, 2022-May 20, 2022, Apr. 29, 2022, 10 Pages, XP052153128, section 2.6, p. 6-p. 7.
Nokia, et al., "On Channel Access Mechanism and Evaluation Methodology for SL-U", 3GPP TSG RAN WG1 #109-e, R1-2203122, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 7 Pages, XP052143943, section 2.3, p. 3-p. 4.

\* cited by examiner

RESOURCE ALLOCATION FOR CHANNEL OCCUPANCY TIME SHARING IN MODE TWO SIDELINK COMMUNICATION

TECHNICAL FIELD

This application relates to wireless communication systems, and more particularly, to resource allocation for channel occupancy time (COT) sharing in mode two sidelink communication.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first sidelink user equipment (UE) may include performing a first listen-before-talk (LBT) procedure; transmitting, to a second sidelink UE based on the first LBT procedure being successful, at least one of a resource indicator indicating resources associated with a sidelink communication, wherein the resources are indicated relative to when the LBT procedure is successful; or a channel occupancy time (COT) indicator associated with COT sharing.

In an additional aspect of the disclosure, a method of wireless communication performed by a first sidelink user equipment (UE) may include receiving, from a second sidelink UE a first resource indicator indicating resources associated with a sidelink communication, wherein the resources are indicated relative to a beginning of a first channel occupancy time (COT); and a first COT indicator associated with COT sharing; performing a first listen-before-talk (LBT) procedure; and transmitting, to a third sidelink UE, based on the first LBT procedure being successful and based at least in part on the first resource indicator or the first COT indicator, a sidelink communication during the COT.

In an additional aspect of the disclosure, a first sidelink user equipment (UE) may include a memory; a transceiver; and at least one processor coupled to the memory and the transceiver, wherein the first sidelink UE is configured to perform a first listen-before-talk (LBT) procedure; transmit, to a second sidelink UE based on the first LBT procedure being successful, at least one of a resource indicator indicating resources associated with a sidelink communication, wherein the resources are indicated relative to when the first LBT procedure is successful; or a channel occupancy time (COT) indicator associated with COT sharing.

In an additional aspect of the disclosure, a first sidelink user equipment (UE) may include a memory; a transceiver; and at least one processor coupled to the memory and the transceiver, wherein the first sidelink UE is configured to receive, from a second sidelink UE a first resource indicator indicating resources associated with a sidelink communication, wherein the resources are indicated relative to a beginning of a first channel occupancy time (COT); and a first COT indicator associated with COT sharing; perform a first listen-before-talk (LBT) procedure; and transmit, to a third sidelink UE, based on the first LBT procedure being successful and based at least in part on the first resource indicator or the first COT indicator, a sidelink communication during the COT.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
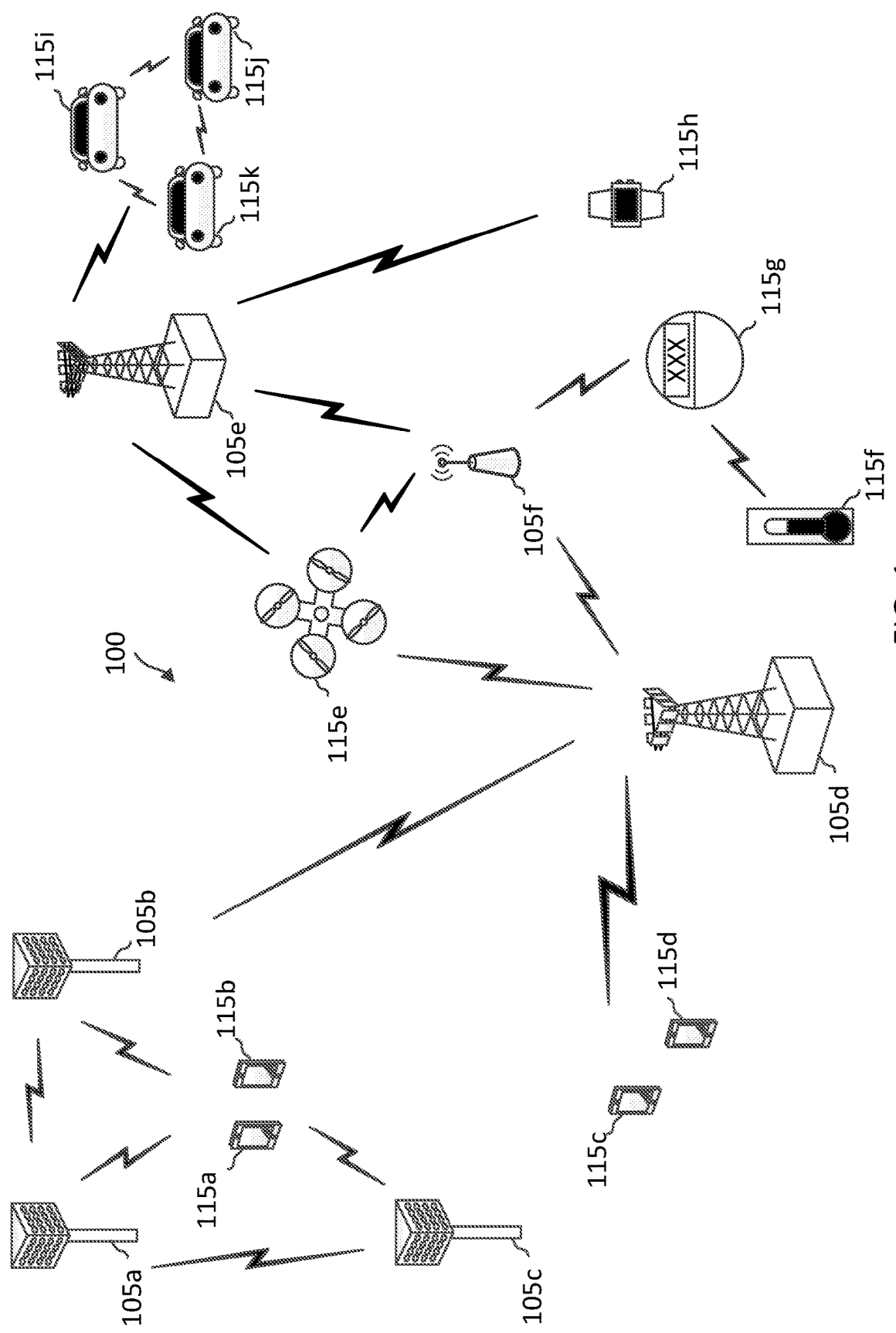
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~ 1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNII) radio band has a minimum OCB requirement of about at least 70 percent (%).

Some sidelink systems may operate over a 20 MHz bandwidth, e.g., for listen before talk (LBT) based channel accessing, in an unlicensed band. A BS may configure a sidelink resource pool over one or multiple 20 MHz LBT sub-bands for sidelink communications. A sidelink resource pool is typically allocated with multiple frequency subchannels within a sidelink band width part (SL-BWP) and a sidelink UE may select a sidelink resource (e.g., one or multiple subchannels in frequency and one or multiple slots in time) from the sidelink resource pool for sidelink communication.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a vehicle (e.g., a car, a truck, a bus, an autonomous vehicle, an aircraft, a boat, etc.). Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. In some aspects, the UE 115*h* may harvest energy from an ambient environment associated with the UE 115*h*. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115k may perform a first listen-before-talk (LBT) procedure. The UE 115k may perform a first LBT procedure in an unlicensed band. The UE 115k may transmit, to the UE 115j based on the first LBT procedure being successful, at least one of a resource indicator indicating resources associated with a sidelink communication, wherein the resources are indicated relative to when the LBT procedure is successful or a channel occupancy time (COT) indicator associated with COT sharing. The UE 115k may transmit the resource indicator and/or the COT indicator to the UE 115j in the same communication (e.g., the same slot) as a PSSCH. The PSSCH may carry one or more transport blocks.

Figure 2:
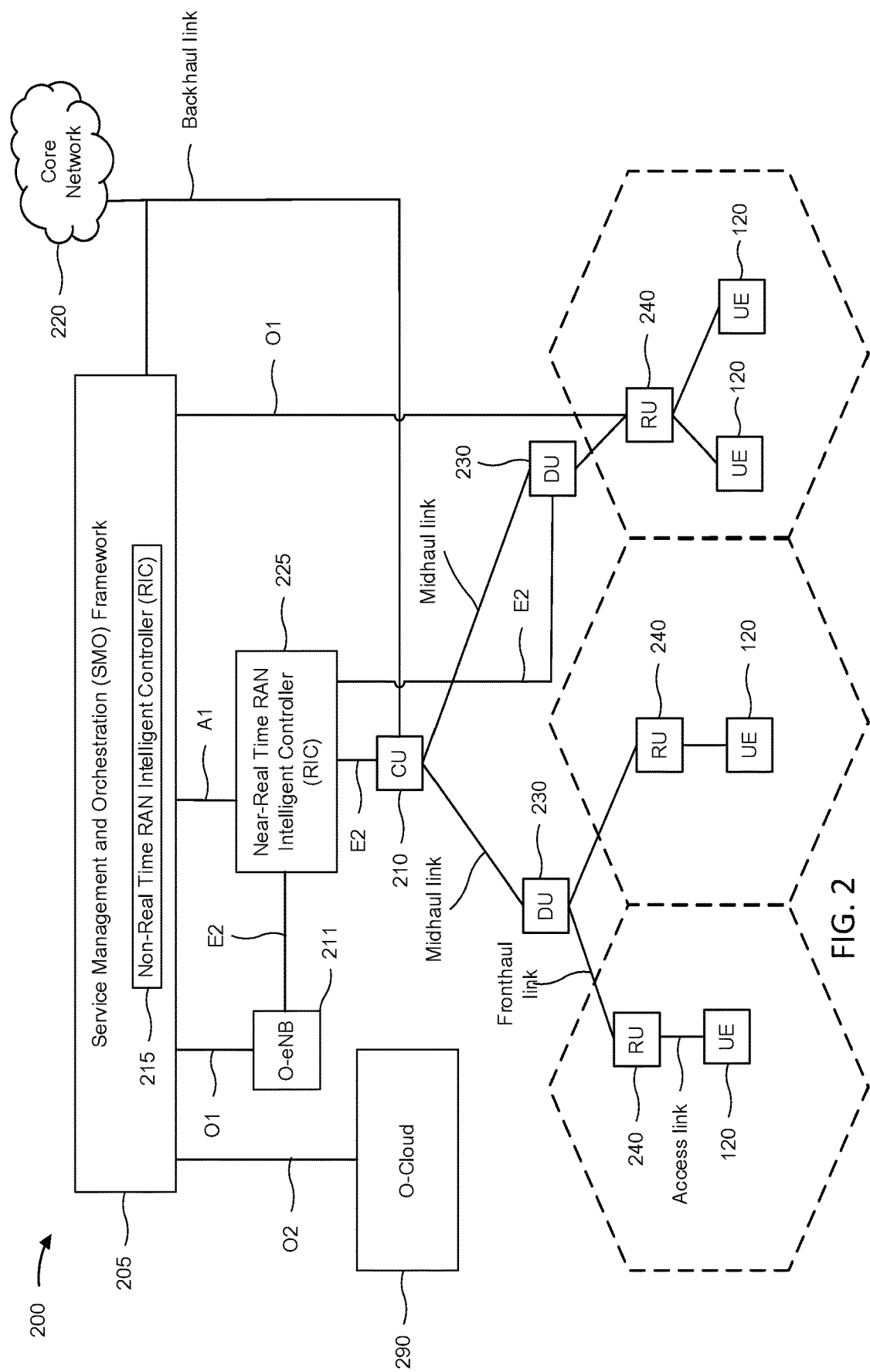
FIG. 2 illustrates an example disaggregated base station architecture according to some aspects of the present disclosure

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 120 via one or more radio frequency (RF) access links. In some implementations, the UE 120 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 120. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In some aspects, a first UE 120 may perform a first listen-before-talk (LBT) procedure. The first UE 120 may perform a first LBT procedure in an unlicensed band. The first UE 120 may transmit, to a second UE 120 based on the first LBT procedure being successful, at least one of a resource indicator indicating resources associated with a sidelink communication, wherein the resources are indicated relative to when the LBT procedure is successful or a channel occupancy time (COT) indicator associated with COT sharing. The first UE 120 may transmit the resource indicator and/or the COT indicator to the second UE 120 in the same communication (e.g., the same slot) as a PSSCH. The PSSCH may carry one or more transport blocks.

Figure 3:
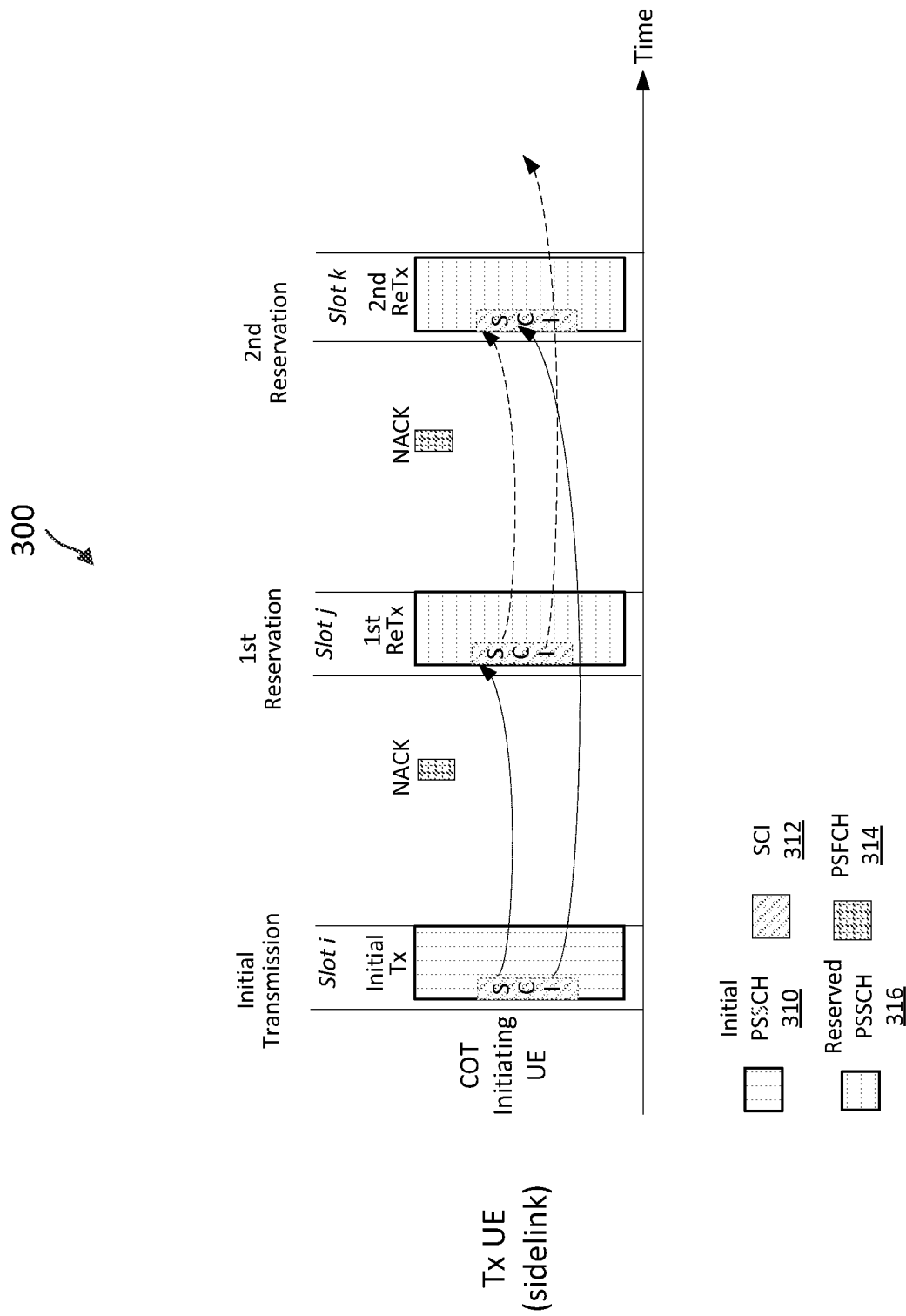
FIG. 3 illustrates an example of a resource configuration that supports COT sharing in sidelink communication according to some aspects of the present disclosure.

FIG. 3 illustrates an example of a resource selection and indication 300 that supports COT sharing in sidelink communication in accordance with some aspects of the present disclosure. The resource configuration 300 may be implemented by aspects of the wireless communications network 100 and/or the wireless communications network 200. For example, the resource configuration 300 may be implemented for sidelink communications by one or more UEs, (e.g., UE 115, UE 120, or UE 700) such as described by the wireless communications network 100 and/or 200. In FIG. 3, the x-axis represents time in some arbitrary units.

In some aspects, a sidelink UE may operate in resource allocation mode 2 in which a medium access control (MAC) layer of the sidelink UE (e.g., a transmitting UE) may select resources for an initial transmission in slot i, a first retransmission in slot j, and a second retransmission in slot k. The sidelink resource selection at MAC layer may indicate the resources to physical layer for an initial transmission in slot i and the reserved resources (e.g., 2 sets of reserved resources) in slots j and k for future transmissions (e.g., retransmission(s) if the initial transmission in slot i fails (e.g., a HARQ NACK is transmitted in PSFCH 314 to the transmitting UE)). The UE (e.g., a physical layer of the UE) may transmit an indication of the reserved resources to other sidelink UEs. The sidelink transmitting UE may transmit an indication of the reserved resources to sidelink UEs intending to share a COT with the sidelink transmitting UE. The UE may transmit an indication of the reserved resources (e.g., reserved resources in slot j and slot k for transmissions or retransmissions) to other sidelink UEs via the SCI (e.g., SCI-1 and/or SCI-2). In some aspects, the UE may transmit an indicator of the reserved resources for future transmissions or retransmissions in the SCI of slot i (e.g., transmitted with the initial transmission). The UE may subsequently transmit reserved resources for two future transmissions or retransmissions in the SCI of slot j. The UE may then subsequently transmit selected resources for two future transmissions or retransmissions in the SCI of slot k, etc. The transmission of reserved resource indicators may continue in this cascaded fashion. The sidelink UEs receiving the indicators of the reserved resources may refrain from transmitting in those reserved resources to allow the sidelink UE transmitting the indicator to transmit sidelink communications in the reserved resources.

Figure 4:
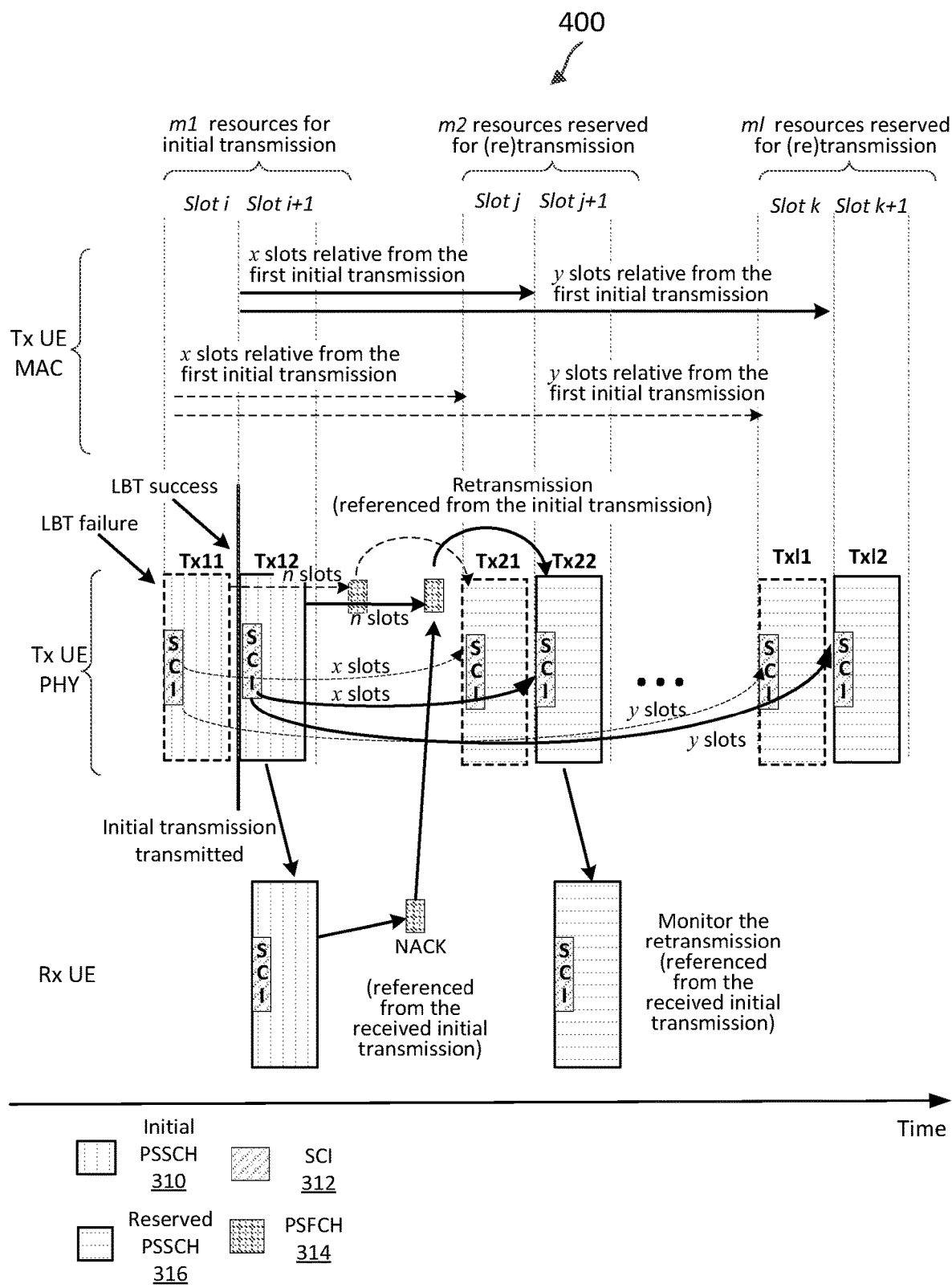
FIG. 4 illustrates an example of a resource selection and indication that supports COT sharing in sidelink communication according to some aspects of the present disclosure.

FIG. 4 illustrates an example of a resource selection and indication 400 that supports COT sharing in sidelink communication in accordance with some aspects of the present disclosure. The resource selection and indication 400 may be implemented by aspects of the wireless communications network 100 and/or the wireless communications network 200. For example, the resource configuration 400 may be implemented for sidelink communications by one or more UEs (e.g., UE 115, UE 120, or UE 700) such as described by the wireless communications network 100 and/or 200. In FIG. 4, the x-axis represents time in some arbitrary units.

In some aspects, a first sidelink UE (e.g., the UE 115, the UE 120, or the UE 700) may perform a listen-before-talk (LBT) procedure. The first sidelink UE may perform the LBT procedure or other clear channel assessment (CCA) on one or more sidelink communication channels. In some instances, the first sidelink UE may perform the LBT procedure or other CCA to gain access to a channel occupancy time (COT) in an unlicensed (e.g., shared) frequency spectrum. For example, the first sidelink UE may perform a category 2 LBT, a category 3 LBT, and/or a category 4 LBT to gain access to the COT. In some aspects, the first sidelink UE may perform the LBT in one or more time resources, spatial resources, and/or frequency resources. The frequency resources may include a frequency spectrum, a frequency band, a frequency sub-band, a frequency subchannel, resource elements, resource blocks, and/or a frequency interlace. The time resources may include slot(s), sub-slot(s) (e.g., mini-slot), symbol(s), subframe(s), or any other suitable time resources. In some aspects, the first sidelink UE may perform the LBT for in all directions (e.g., using omnidirectional antenna). In some aspects, the first sidelink UE may perform the LBT for one or more directions (e.g., using directional antenna with a beam in the direction of the UE that the first sidelink UE intends to transmit a communication to and/or receive a communication from).

In some aspects, the first sidelink UE may transmit a resource indicator indicating resources reserved for a sidelink communication and/or a first channel occupancy time (COT) indicator for COT sharing. In this regard, the first sidelink UE (e.g., a transmitting UE) may transmit the resource indicator and/or the COT indicator via SCI 312 or MAC CE on PSSCH 310 respectively. In some aspects, the first sidelink UE may transmit the resource indicator and/or the COT indicator to the receiving sidelink UE(s) that the first sidelink UE intends to communicate with. Additionally or alternatively, as described with reference to FIG. 5 below, the first sidelink UE may transmit the resource indicator and/or the COT indicator to other sidelink UEs that the first sidelink UE intends to share the COT with. For example, the first sidelink UE may intend to share the COT with other sidelink UEs in proximity to the first sidelink UE. In some aspects, the first sidelink UE may transmit the resource indicator and/or the COT indicator based on the first LBT procedure being successful.

In some aspects, the resource indicator transmitted by the first sidelink UE may indicate the resources associated with the sidelink communication relative to when the LBT procedure (e.g., a first LBT, a second LBT, etc.) is successful. For example, if the first sidelink UE performs a successful LBT at slot i, then the resource indicator may indicate the resources associated with the sidelink communication relative to slot i. In some instances, the resource indicator may indicate the resources associated with the sidelink communication as a number (e.g., an integer number) of slots, a number of sub-slots, or a number of symbols from slot i (e.g., the end of slot i and/or the beginning of slot i). In some aspects, the resource indicator may indicate the resources associated with the sidelink communication as a time value (e.g., number of milliseconds) relative to slot i.

In some aspects, the COT indicator transmitted by the first sidelink UE may indicate a COT identifier (ID), the start of the COT, and/or the COT duration. In some aspects, a sidelink UE may receive one or more COT indicators from other sidelink UEs, including the first sidelink UE, indicating multiple COT identifiers. The COT identifier(s) may identify one or more COTs that the first sidelink UE may initiate and share with sidelink UEs. The first sidelink UE may transmit the COT identifier(s) to the sidelink receiving UE (e.g., a second sidelink UE sharing the COT for HARQ feedback on PSFCH or sharing the COT for a data packet or MAC CE on PSSCH) and the COT sharing UEs (e.g., a third sidelink UE, a fourth sidelink UE, etc.) via SCI 312 or MAC CE on PSSCH 310 associated to the first transmission with a successful LBT. The COT identifier may identify a COT that may be shared among sidelink UEs in proximity to one another.

In some aspects, the location (e.g., a zone identity, a beam coverage pattern, a cell sector, a latitude/longitude range, a geofence, etc.) associated with the first sidelink UE and other COT sharing UEs may be used to determine aspects of COT sharing for the first sidelink UE and one or more of the other COT sharing UEs. In some aspects, the first sidelink UE may determine its location based on positioning procedure, GPS coordinates, radio frequency triangulation, and/or other suitable method. Additionally or alternatively, the first sidelink UE may determine its location based on a zone identity associated with the first sidelink UE. In this regard, the first UE may determine its zone identity based on 3GPP TS 38.331, section 5.8.11 or other standard specification related to zone identity. In some aspects, a third UE may determine to share a COT or not based at least in part on the distance from the first UE (e.g., based on the first UE's location indicated in SCI or MAC CE associated with the first COT indicator and the third UE's own location). For example, the UE may decide to share the COT if the distance is within a communication range configured or indicated by the first UE in the SCI or MAC CE associated with the first COT indicator. For another example, the UE may decide not to share the COT if the distance is beyond a communication range configured or indicated by the first UE in the SCI or MAC CE associated with the first COT indicator.

In some aspects, the starting point of the COT (e.g. a starting slot, starting sub-slot, and/or starting symbol) may be based on the first sidelink UE performing a successful LBT. For example, the first sidelink UE may have resources selected by MAC layer for an initial transmission in slot (i) and slot (i+1). The resources may be a set of resources of a resource pool. The set(s) of resources may each include a number of slots (e.g., contiguous slots), a number of sub-slots (e.g., contiguous sub-slots), and/or a number of symbols (e.g., contiguous symbols).

In some aspects, the first sidelink UE may perform an LBT before slot (i) in order to gain access to the channel and initiate a COT during slot (i). If the LBT for accessing slot (i) is unsuccessful as shown in FIG. 4, then the first sidelink UE may wait a period of time (e.g., a backoff time period) to perform another LBT at an offset from the next slot boundary between slot (i) and slot (i+1). If the subsequent LBT is successful, then the first sidelink UE may gain access to the channel and initiate a COT starting at slot (i+1). When the LBT is successful, the first sidelink UE may transmit the resource indicator and/or the COT indicator to the receiving sidelink UE and other COT sharing UEs. For example, if the LBT is successful for an initial transmission at slot (i+1), the COT indicator may indicate the COT begins at slot (i+1) (e.g., implicitly indicated by the first COT indicator in the SCI or MAC CE associated to the first transmission initiating the COT or explicitly in a second COT indicator in the SCI or MAC CE associated to a transmission sharing the COT by the first UE, the receiving UE or other UEs sharing the COT after the first COT indicator). The receiving sidelink UE will monitor for the initial PSSCH 310 in slot (i+1).

The resource allocation transmitted by the first sidelink UE may indicate reserved resources that the first sidelink UE may use to transmit and/or retransmit sidelink communications. In some instances, the resource allocation may indicate time resources (e.g., slots, sub-slots, and/or symbols) for the first sidelink UE to transmit relative to when the first sidelink UE performs a successful LBT for an initial transmission at slot (i+1). In some aspects, the first sidelink UE may select one or more sets of resources (e.g., a number of contiguous slots). For example, the first sidelink UE may select a first set of resources m1 allocated for an initial sidelink transmission, a second set of resources m2 allocated for transmission or retransmission, and a third set of resources ml (l>2) allocated for transmission or retransmission. The second set of resources m2 may be indicated as x slots after the first set of resources m1 (e.g., the first resource of the set of resources m2 is x slots after the first resource of the set of resources m1, the second resource of the set of resources m2 is x slots after the second resource of the set of resources m1, and so on). The third set of resources ml may be indicated as y slots after the first set of resources m1 (e.g., the first resource of the set of resources m1 is y slots after the first resource of the set of resources m1, the second resource of the set of resources m1 is y slots after the second resource of the set of resources m1, and so on). In some aspects, x may be the same or different from y. In some aspects, y may be greater than x.

In some aspects, the time gap (e.g., x slots) between a first resource of the first set of resources m1 and the first resource of the second set of resources m2 may be based at least in part on the resource configuration for PSFCH in the resource pool and the time required for the sidelink receiving UE to process the initial PSSCH 310 and generate/transmit an associated HARQ feedback in PSFCH 314 and/or the time required for the first sidelink UE to receive and process the HARQ feedback in PSFCH 314 and generate/transmit a retransmission in the reserved PSSCH 316 (e.g., based on the HARQ feedback being a NACK). Similarly, the resource configuration for PSFCH in the resource pool and the time gap (e.g., y slots) between a first resource of the first set of resources m1 and the first resource of the third set of resources ml may be based on the time required for the receiving sidelink UE to process a received transmission and generate/transmit an associated HARQ feedback and/or the time required for the first sidelink UE to receive and process the HARQ feedback and generate/transmit a second retransmission in the reserved PSSCH 316 (e.g., based on the HARQ feedback being a second NACK). The sidelink UE receiving the transmission from the first sidelink UE may transmit the HARQ feedback to the first sidelink UE in the PSFCH 314 relative to the transmission by the first sidelink UE. For example, if the first sidelink UE performs a successful LBT just prior to slot (i+1) and transmits the communication in slot (i+1), the receiving sidelink UE(s) may transmit the HARQ feedback in slot (i+1+n) and the first UE may monitor the HARQ feedback in slot (i+1+n), where n is the number of slots relative to the transmission in slot (i+1).

The first sidelink UE may transmit the sidelink communication (e.g., one or more transport blocks) during the COT to the receiving sidelink UE based on the LBT procedure for the transmission at slot (i+1) being successful. In this regard, the first sidelink UE may transmit a sidelink communication (e.g., a first retransmission based on the NACK received) to the receiving sidelink UE in resources indicated relative to slot (i+1) (e.g., x slots after the initial transmission in slot i+1) and the receiving UE(s) may monitor a sidelink communication to the receiving sidelink UE in resources indicated relative to slot (i+1) (e.g., x slots after the initial transmission in slot i+1).

Figure 5:
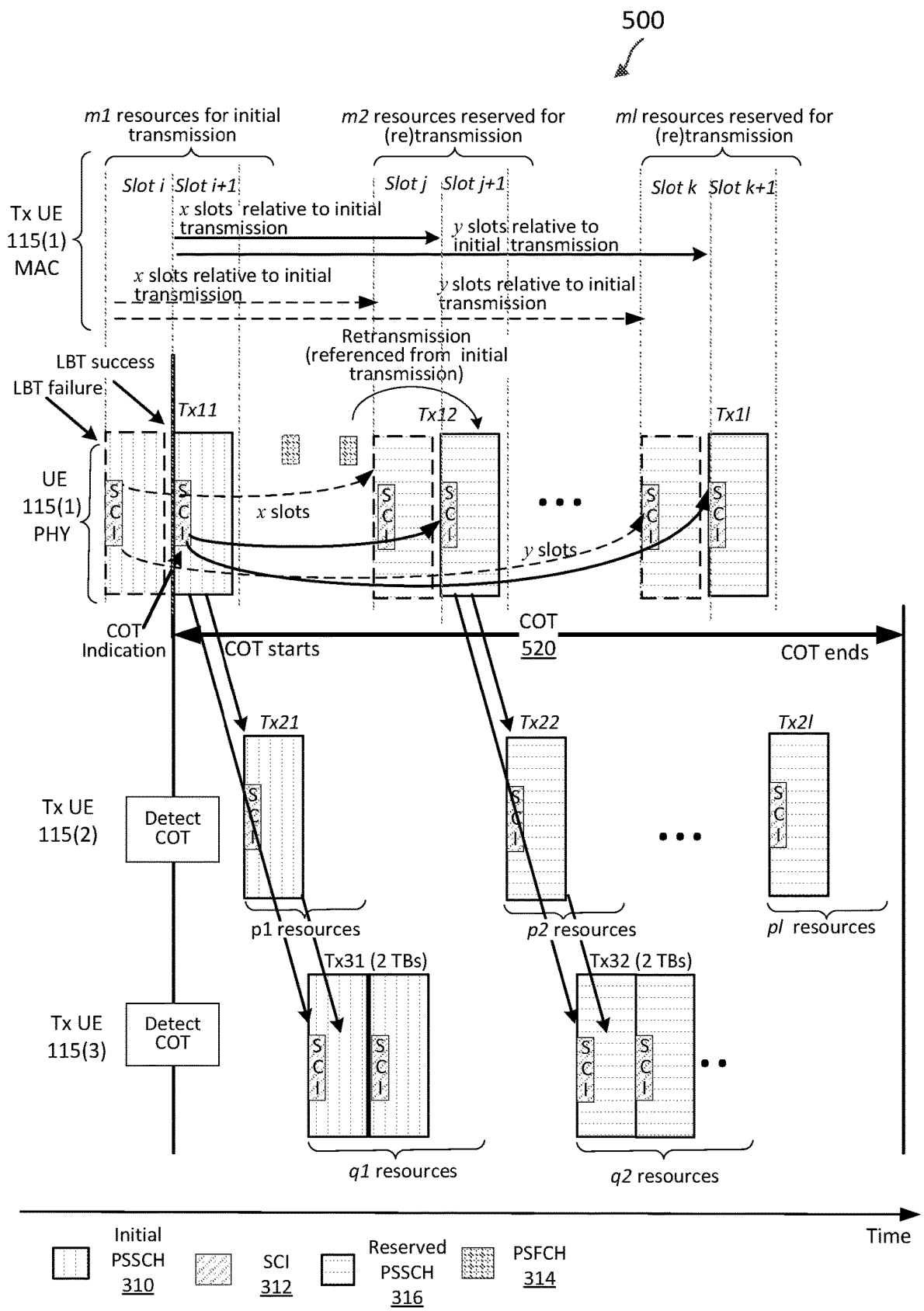
FIG. 5 illustrates an example of a resource selection and indication that supports COT sharing in sidelink communication according to some aspects of the present disclosure.

FIG. 5 illustrates an example of a resource selection and indication 500 that supports COT sharing in sidelink communication in accordance with some aspects of the present disclosure. The resource selection and indication 500 may be implemented by aspects of the wireless communications network 100 and/or the wireless communications network 200. For example, the resource selection and indication 500 may be implemented for sidelink communications by one or more UEs, (e.g., UE 115, UE 120, or UE 700) such as described by the wireless communications network 100 and/or 200. In FIG. 5, the x-axis represents time in some arbitrary units.

In some aspects, a sidelink UE 115(1) may transmit a resource indicator indicating resources associated with a sidelink communication and/or a first channel occupancy time (COT) indicator for COT sharing to other sidelink UEs. As shown in FIG. 5, the sidelink UE 115(1) may transmit the resource indicator and/or the first COT indicator to UE 115(2) and UE 115(3) in order for UEs 115(1), UE 115(2), and UE 115(3) to share the COT 520. For example, the UE 115(1) may share the COT with UE 115(2) and UE 115(3) in proximity to the UE 115(1). In some aspects, the UE 115(1) may transmit the resource indicator and/or the first COT indicator based on an LBT procedure being successful. The UE 115(1) (e.g., a transmitting sidelink UE) may transmit the resource indicator and/or the first COT indicator to UE 115(2) and UE 115(3) via SCI 312 or MAC CE on PSSCH 310. In some aspects, the first sidelink UE may also transmit the resource indicator and/or the first COT indicator to the receiving sidelink UE(s) that the UE 115(1) intends to communicate with (e.g., a receiving sidelink UE) as described above (e.g., HARQ feedback with PSFCH) with reference to FIG. 4. In some aspects, the first sidelink UE may also transmit the resource indicator and/or the first COT indicator to the receiving sidelink UE(s) that the UE 115(1) intends to communicate with, e.g., a data packet and/or MAC CE carried on PSSCH from UE 115(2) to UE 115(1).

In some aspects, the first COT indicator transmitted by the UE 115(1) may indicate a COT duration associated to a COT ID. The COT duration may indicate a time period for sidelink UEs to share the COT 520 in which the UE 115(1), UE 115(2), and UE 115(3) may transmit. The COT duration may start from a first transmission with successful LBT by the UE 115(1). In some aspects, the COT duration may be based on an amount of data (e.g., transport blocks) the UE 115(1), UE 115(2), and/or the UE 115(3) intend to transmit (e.g., based on the QoS profile for a sidelink communication participated by UEs in the proximity). A larger amount of data may require a longer COT duration as compared to a smaller amount of data. The COT duration may be indicated to the COT sharing UE(s) as a number of slots, a number of sub-slots, a number of symbols, a number of milliseconds, or a combination thereof. In some aspects, the COT duration may be indicated as a remaining COT duration. For example, the COT duration may be a duration of e slots. The UE 115(1) may use f slots of the e slots to transmit sidelink communications. The remaining COT duration may be indicated to the receiving sidelink UE and/or other COT sharing sidelink UEs as e f slots.

In some aspects, the COT duration may be indicated as a COT extension. The UE 115(1) may initially indicate the COT duration as e slots in the first COT indicator in the SCI or MAC CE associated to the first transmission with a successful LBT for accessing the channel. The UE 115(1) or receiving UE of UE 115(1) or another UE 115 may subsequently extend the COT 520 in a second COT indicator in the SCI or MAC CE associated to the transmission sharing the COT (e.g., after the first transmission initiating the COT) by indicating the COT duration as e+g slots, where g represents the COT extension. For example, the UE 115(1) may indicate the COT extension in a subsequent transmission (e.g., in a second, third or other subsequent transmission) as e+g slots. In some aspects, the COT 520 may be extended based on a failed transmission(s) (e.g., the UE 115(1) receives a NACK in PSFCH 314 from a receiving sidelink UE) requiring a retransmission. In some aspects, the COT 520 may be extended based on the number of UEs sharing the COT in proximity. In some aspects, the UE 115(1) may also include in the COT indicator if extension to the COT associated to a COT ID is allowed or not.

In some aspects, the resource indicator transmitted by the UE 115(1) may indicate the resources associated with the sidelink communication relative to when the LBT procedure is successful. For example, if the UE 115(1) performs a successful LBT for a transmission at slot i, then the resource indicator may indicate the resources associated with the sidelink communication relative to slot i. In some instances, the resource indicator may indicate the resources associated with the sidelink communication as a number (e.g., an integer number) of slots, a number of sub-slots, or a number of symbols from slot i (e.g., the end of slot i and/or the beginning of slot i). In some aspects, the resource indicator may indicate the resources associated with the sidelink communication as a time value (e.g., number of milliseconds) relative to slot i.

In some aspects, the first COT indicator transmitted by the UE 115(1) may indicate a COT identifier (ID), the start of the COT 520 (e.g., implicitly indicated by the first COT indicator in the SCI or MAC CE associated to the first transmission initiating the COT or explicitly in a second COT indicator in the SCI or MAC CE associated to a transmission sharing the COT by the first UE, the receiving UE or other UEs sharing the COT after the first COT indicator), and/or the COT duration or COT ending point. In some aspects, a sidelink UE may receive one or more COT indicators from other sidelink UEs, including the UE 115(1), indicating multiple COT identifiers. The COT identifier(s) may identify one or more COTs that the UE 115(1) may initiate and share with UEs such as the UE 115(2) and the UE 115(3) and the receiving UE of UE 115(1). The UE 115(1) may transmit the COT identifier(s) to the COT sharing UEs (e.g., UE 115(2), UE 115(3)) and the receiving UE of UE 115(1) via SCI 312 or MAC CE on PSSCH 310 after a successful LBT for a first transmission. The COT identifier may identify a COT 520 that may be shared among sidelink UEs in proximity to one another.

In some aspects, the location (e.g., a zone identity, a beam coverage pattern, a cell sector, a latitude/longitude range, a geofence, etc.) associated with the UE 115(1), UE 115(2), UE 115(3) and the receiving UE of UE 115(1) may be used to determine aspects of COT sharing for the UE 115(1), UE 115(2), UE 115(3) and the receiving UE of UE 115(1) as described in details with the reference of FIG. 4.

In some aspects, a COT may be shared for a pair of source ID and destination ID (e.g., associated to a unicast or a PC5 connection, for example, between a transmitting UE and receiving UE) as indicated in the SCI (e.g. L1 source and destination IDs) or MAC CE (L1 and/or L2 source and destination IDs) associated with the first COT indicator transmitted by the UE 115(1). In some aspects, a COT may be shared for a destination ID (e.g., associated to a groupcast or broadcast) as indicated in the SCI (e.g. L1 destination ID) or MAC CE (L1 and/or L2 destination ID) associated with the first COT indicator transmitted by the UE 115(1). In some aspects, if enabled by preconfiguration or configuration or by an indication in the first COT indicator transmitted by the UE 115(1), a COT may be shared for different pairs of source ID and destination ID (e.g., for different unicasts) or different destination ID (e.g., for different groupcasts or broadcasts) comparing with the pair of source ID and destination ID or destination ID indicated in the SCI (e.g. L1 source and destination ID pair or L1 destination ID) or the MAC CE (L1 and/or L2 source and destination ID pair or L1 and/or L2 destination ID) associated with the first COT indicator transmitted by the UE 115(1).

In some aspects, the UE 115(1) may perform an LBT (e.g., a category 2 LBT, a category 3 LBT, and/or a category 4 LBT) before slot (i) in order to gain access to the channel and initiate a COT during slot (i). If the LBT at slot (i) is unsuccessful as shown in FIG. 5, then the UE 115(1) may wait a period of time (e.g., a backoff time period) to perform another LBT at an offset from the next slot boundary between slot (i) and slot (i+1). If the subsequent LBT is successful, then the UE 115(1) may gain the channel and initiate a COT starting at slot (i+1). When the LBT is successful, the UE 115(1) may transmit the resource indicator and/or the COT indicator to the UE 115(2) and/or UE 115(3) and/or the receiving UE of UE 115(1). For example, if the LBT is successful for the first transmission at slot (i+1), the COT indicator may indicate the COT begins at slot (i+1) (e.g., implicitly indicated by the first COT indicator in the SCI or MAC CE associated to the first transmission initiating the COT or explicitly in a second COT indicator in the SCI or MAC CE associated to a transmission sharing the COT by the first UE, the receiving UE or other UEs sharing the COT after the first COT indicator).

The resource allocation transmitted by the UE 115(1) may indicate reserved resources that the UE 115(1) may use to transmit and/or retransmit sidelink communications. In some instances, the resource allocation may indicate time resources (e.g., slots, sub-slots, and/or symbols) for the UE 115(1) to transmit relative to when the UE 115(1) performs a successful LBT for the first transmission at slot (i+1). In some aspects, the first sidelink UE may be allocated one or more sets of resources (e.g., a number of contiguous slots). For example, the UE 115(1) may have a first set of resources m1 allocated for an initial sidelink transmission, a second set of resources m2 allocated for transmission or retransmission, and a third set of resources ml allocated for transmission or retransmission. The second set of resources m2 may be indicated as x slots after the first set of resources m1. The third set of resources ml may be indicated as y slots after the first set of resources m1. In some aspects, x may be the same or different from y. In some aspects, y may be greater than x. Similarly, the UE 115(2) may have a first set of resources p1 allocated for an initial sidelink transmission, a second set of resources p2 allocated for transmission or retransmission, and a third set of resources pl (l>2) allocated for transmission or retransmission. To share the COT (e.g., to continue the COT with seamless transmissions from the UEs sharing the COT), the selection of resources p1, p2, and pl may be based on the resources used (e.g., resources m1) or reserved (e.g., resources m2 and/or resources ml) by the UE 115(1), for example, the first resource of resource set p1 for transmission Tx21 (e.g., with one TB transmitted) is based on the transmission Tx11 from UE 115(1), the first resource of resource set p2 for transmission Tx22 is based on the transmission Tx12 from UE 115(1), and the first resource of resource set pl for transmission Tx2l is based on the transmission Tx1l from UE 115(1). Since at least resources m2 and resources ml are relative to the start of the COT 520 when the UE 115(1) performs the successful LBT for the first transmission initiating the COT, the resources p1, p2, and pl may be indicated relative to the start of the COT 520 when the UE 115(1) performs the successful LBT for the first transmission initiating the COT. Similarly, the UE 115(3) may have a first set of resources q1 allocated for an initial sidelink transmission, a second set of resources q2 allocated for transmission or retransmission, and so on. so on To share the COT (e.g., to continue the COT with seamless transmissions from the UEs sharing the COT), the selection of resources q1 and q2 may be based on the resources used (e.g., resources m1 and/or resources p1) or reserved (e.g., (e.g., resources m2 and/or resources p2) by the UE 115(1) and UE 115(2) respectively, for example, the first resource of resource set q1 for transmission Tx31 (e.g., with more than one TB transmitted) is based on the transmission Tx11 from UE 115(1) and the transmission Tx21 from UE 115(2), and the first resource of resource set p2 for transmission Tx32 is based on the transmission Tx12 from UE 115(1) and the transmission Tx22 from UE 115(2). Since at least resources m2 and resources p2 are relative to the start of the COT 520 when the UE 115(1) performs the successful LBT for the first transmission initiating the COT, The resources q1 and q2 may be indicated relative to the start of the COT 520 when the UE 115(1) performs the successful LBT for the first transmission initiating the COT. The amount of resources (e.g., number of slots) allocated for resources m1, m2, ml, p1, p2, pl, q1, and q2 may be based on the amount of TBs to be transmitted or retransmitted by the respective UEs. For example, based on the QoS profile(s) associated to one or more sidelink communications sharing the COT.

The UE 115(1) may transmit the sidelink communication (e.g., one or more transport blocks) during the COT 520 to the receiving sidelink UE based on the successful LBT procedure for the first transmission at slot (i+1). In this regard, the UE 115(1) may transmit a sidelink communication to the receiving sidelink UE in resources indicated relative to slot (i+1) (e.g., transmission Tx12 in slot j+1 and/or transmission Tx1l in slot k+1).

Figure 6:
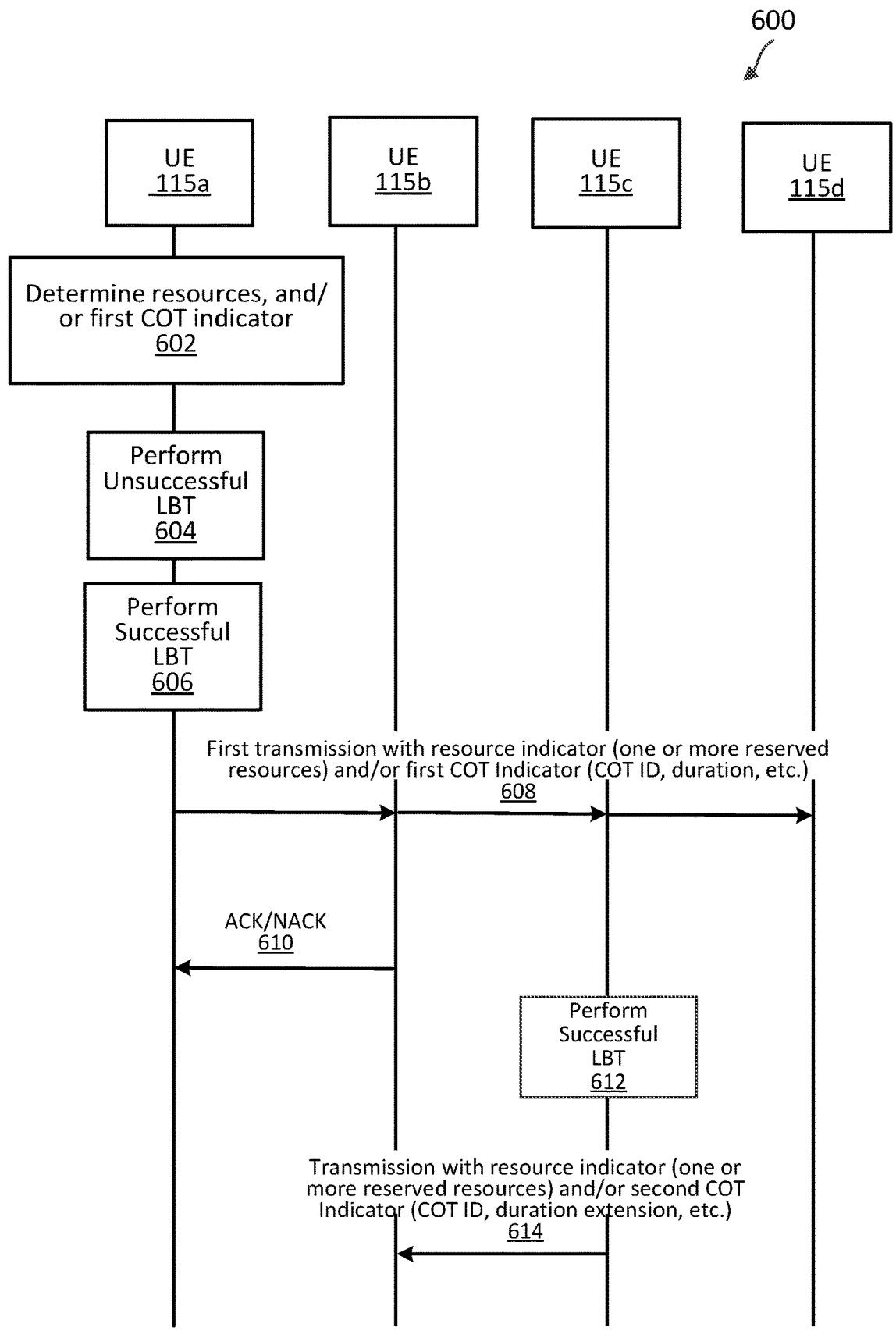
FIG. 6 is a signaling diagram of a wireless communication method according to some aspects of the present disclosure.

FIG. 6 is a signaling diagram of a wireless communication method 600 according to some aspects of the present disclosure. Actions of the communication method 600 can be executed by a computing device (e.g., a processor, processing circuit, and/or other suitable component) of a communication device or other suitable means for performing the actions. For example, a wireless communication device, such as the UE 115, UE 120, or UE 700, may utilize one or more components, such as the processor 702, the memory 704, the COT sharing module 708, the transceiver 710, the modem 712, and the one or more antennas 716, to execute aspects of method 600.

At action 602, the UE 115a may determine resources for a sidelink communication initiating a COT and then sharing the COT. For example, the UE 115a may determine sets of resources (e.g., contiguous or non-contiguous slots) for an initial transmission and/or for (re)transmission(s) respectively. The UE 115a may intend to transmit a sidelink communication (e.g., one or more TBs) to the UE 115b. The UE 115a may determine the resources (e.g., the number of slots) for the initial transmission and for potential retransmission with the TB or for potential transmissions with different TBs. In some aspects, the UE 115a's MAC layer may select a first set resources (e.g., m1 resources with reference to FIG. 5) for a first transmission to start a COT, and select a second and/or a third set resources (e.g., m2 and/or ml resources with reference of FIG. 5) as reserved resource sets, referenced from the first transmission or the COT starting point, for transmissions or retransmissions within the COT.

At action 604, the UE 115a's physical layer may perform an LBT (e.g., CAT 4 LBT) for a first transmission to start a COT at the first resource (e.g., slot i with reference to FIG. 5) of the first set resources selected by UE 115*a*'s MAC layer. If the LBT is unsuccessful, the UE 115*a*'s physical layer may wait a period of time (e.g., one slot period) and proceed to action 606 for a first transmission to start a COT at the second resource (e.g., slot i+1 with reference to FIG. 5) of the first set resources selected by UE 115*a*'s MAC layer.

At action 606, the UE 115*a*'s physical layer may perform a successful LBT procedure or other clear channel assessment (CCA) on one or more sidelink communication channels. The UE 115*a* may perform an LBT procedure or other CCA to gain access to the channel and initiate a COT in an unlicensed (e.g., shared) frequency spectrum. For example, the UE 115*a* may perform a full LBT (e.g., a CAT 4 LBT) to gain access to the channel and initiate a COT in an unlicensed frequency spectrum. In some aspects, the UE 115*a* may perform the LBT in one or more LBT sub-bands (e.g., 20 MHz for LBT). The one or more LBT sub-bands may include subchannels, and/or resource blocks (RBs). In some aspects, the UE 115*a* may perform the LBT for one or more directional beams (e.g., a beam in the direction of the UE 115*b* that the UE 115*a* intends to transmit a communication to). The starting point of the COT may be based on the UE 115*a* performing a first successful LBT for a first transmission.

At action 608, the UE 115*a* may transmit a first transmission with one or more TBs on PSSCH (e.g., PSSCH 310 with reference to FIG. 5) with SCI or MAC CE including at least a resource indicator for reserved resources (e.g., m2 resources with reference to FIG. 5 and/or m3 resources not shown with reference to FIG. 5) and a first COT indicator (e.g., a COT indicator that initiates a COT) to the UE 115*b* indicating the resources that the UE 115*a* intends to use to transmit to the UE 115*b*. The resources may be indicated relative to the start of the COT when the UE 115*a* performs a successful LBT at action 606. The UE 115*a* may also transmit the resource indicator and the COT indicator to the UE 115*c* and UE 115*d* that will share the COT with UE 115*a*. The UE 115*c* and UE 115*d* will refrain from using the resources indicated by the UE 115*a*. The UE 115*c* and UE 115*d* may transmit in the COT using resources other than the resources reserved by the UE 115*a*.

At action 610, the UE 115*b* may transmit HARQ feedback (e.g., ACK/NACK) via a PSFCH communication after a successful LBT (e.g., a CAT2 LBT for sharing the COT with UE 115*a*) to the UE 115*a*. If the PSSCH at action 6088 communication was decoded successfully, the UE 115*b* may transmit an ACK. If the PSSCH at action 608 communication was not decoded successfully, the UE 115*b* may transmit a NACK. The UE 115*b* may transmit the HARQ feedback in resources relative to the successful LBT at action 606. If the UE 115*b* transmits a NACK, the UE 115*a* may perform LBT (e.g., CAT2 LBT for sharing the COT initiated already) for retransmitting the PSSCH (e.g., PSSCH 316 with reference to FIG. 5) communication (e.g., with SCI or MAC CE including a second resource indicator for reserved resources and/or a second COT indicator for sharing the COT which has been initiated already, where the second COT indicator may indicate the COT duration with extension if enabled by configuration or by the indication in the first COT indicator) at one of the second set resources (e.g., m2 resources with reference to FIG. 5) as reserved resources relative to the successful LBT at action 606 and/or the first transmission with the first COT indicator.

At action 612, the COT sharing UE 115*c* may perform a successful LBT to gain access to the channel and share the COT. The COT sharing UE 115*c* may perform a reduced category LBT (e.g., a CAT 2 LBT for sharing the COT) for the first transmission (e.g., PSSCH 310 with reference to FIG. 5) at one or more resources of the first set resources (e.g., p1 resources with reference to FIG. 5) determined by the COT sharing UE 115*c* based at least in part on the start of the COT (e.g. the successful LBT at action 606 and/or the first transmission with the first COT indicator).

At action 614, the COT sharing UE 115*c* may transmit a first transmission on PSSCH (e.g. one or more transport blocks on PSSCH 310 with reference to FIG. 5) with SCI or MAC CE including at least a resource indicator for reserved resources (e.g., p2 resources with reference to FIG. 5 and/or p3 resources not shown with reference to FIG. 5) and a second COT indicator (e.g., for sharing the COT which has been initiated already), where the second COT indicator may indicate the COT duration with extension if enabled by configuration or by the indication in the first COT indicator, to the UE 115*b* based on the successful LBT at action 612. The COT sharing UE 115*c* may transmit the PSSCH communication in one of the first set resources determined by the UE 115*c* based at least in part on the start of the COT (e.g. the successful LBT at action 606 and/or the first transmission with the first COT indicator).

Figure 7:
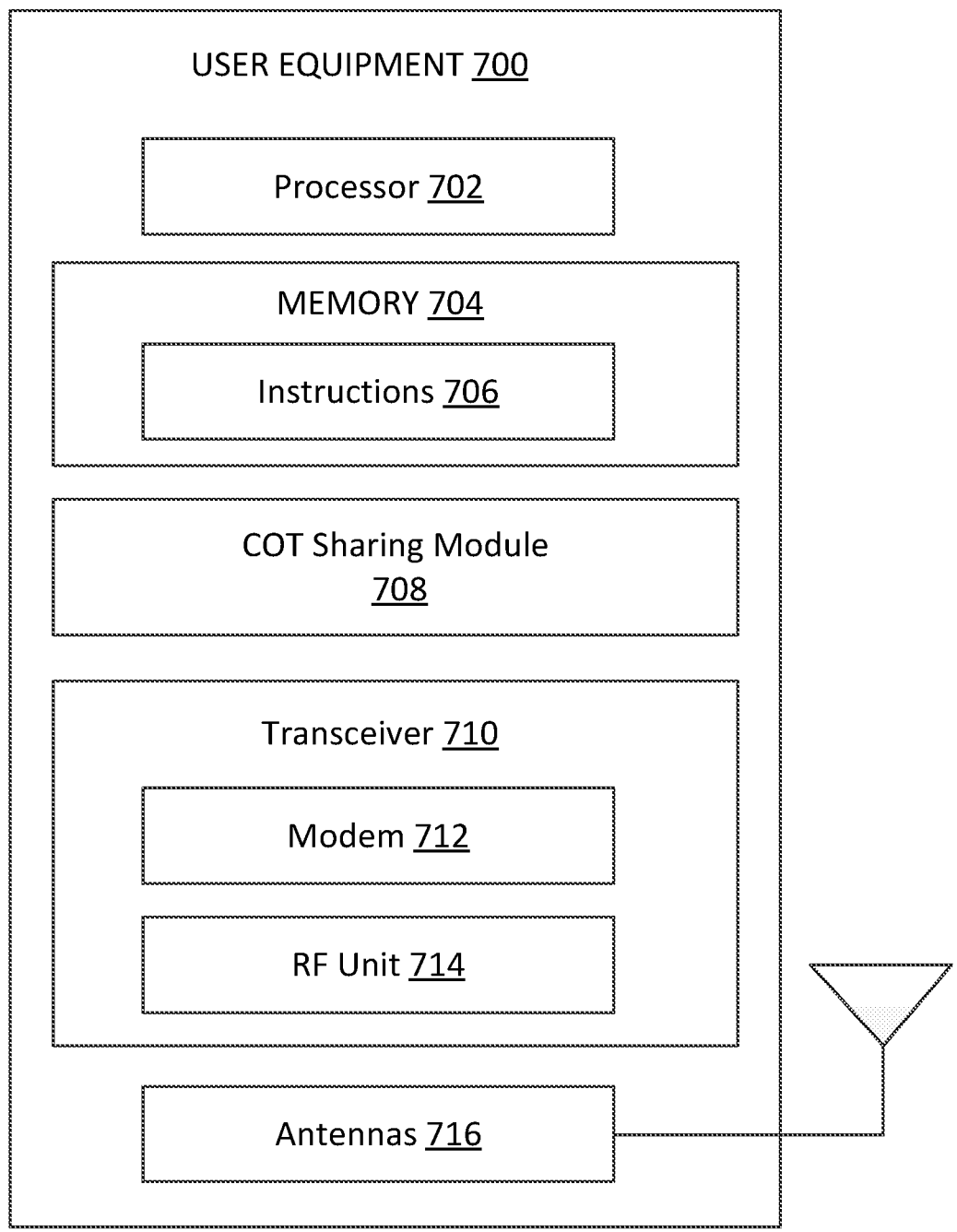
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the UE 115 or the UE 120 in the network 100 or 200 as discussed above. As shown, the UE 700 may include a processor 702, a memory 704, a COT sharing module 708, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 3-6. Instructions 706 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The COT sharing module 708 may be implemented via hardware, software, or combinations thereof. For example, the COT sharing module 708 may be implemented as a processor, circuit, and/or instructions 706 stored in the memory 704 and executed by the processor 702. In some aspects, the COT sharing module 708 may be used to perform a first listen-before-talk (LBT) procedure. The COT sharing module 708 may perform a first LBT procedure in an unlicensed band. The COT sharing module 708 may transmit, to a second UE 700 based on the first LBT procedure being successful, at least one of a resource indicator indicating resources associated with a sidelink communication, wherein the resources are indicated relative to when the LBT procedure is successful or a channel occupancy time (COT) indicator associated with COT sharing. The COT sharing module 708 may transmit the resource indicator and/or the COT indicator in the same communication (e.g., the same slot) as a PSSCH. The PSSCH may carry one or more transport blocks.

As shown, the transceiver 710 may include the modem subsystem 712 and the RF unit 714. The transceiver 710 can be configured to communicate bi-directionally with other devices, such as the BSs 105 and/or the UEs 115. The modem subsystem 712 may be configured to modulate and/or encode the data from the memory 704 and the according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 can include multiple transceivers 710 implementing different RATs (e.g., NR and LTE). In some instances, the UE 700 can include a single transceiver 710 implementing multiple RATs (e.g., NR and LTE). In some instances, the transceiver 710 can include various components, where different combinations of components can implement RATs.

Figure 8:
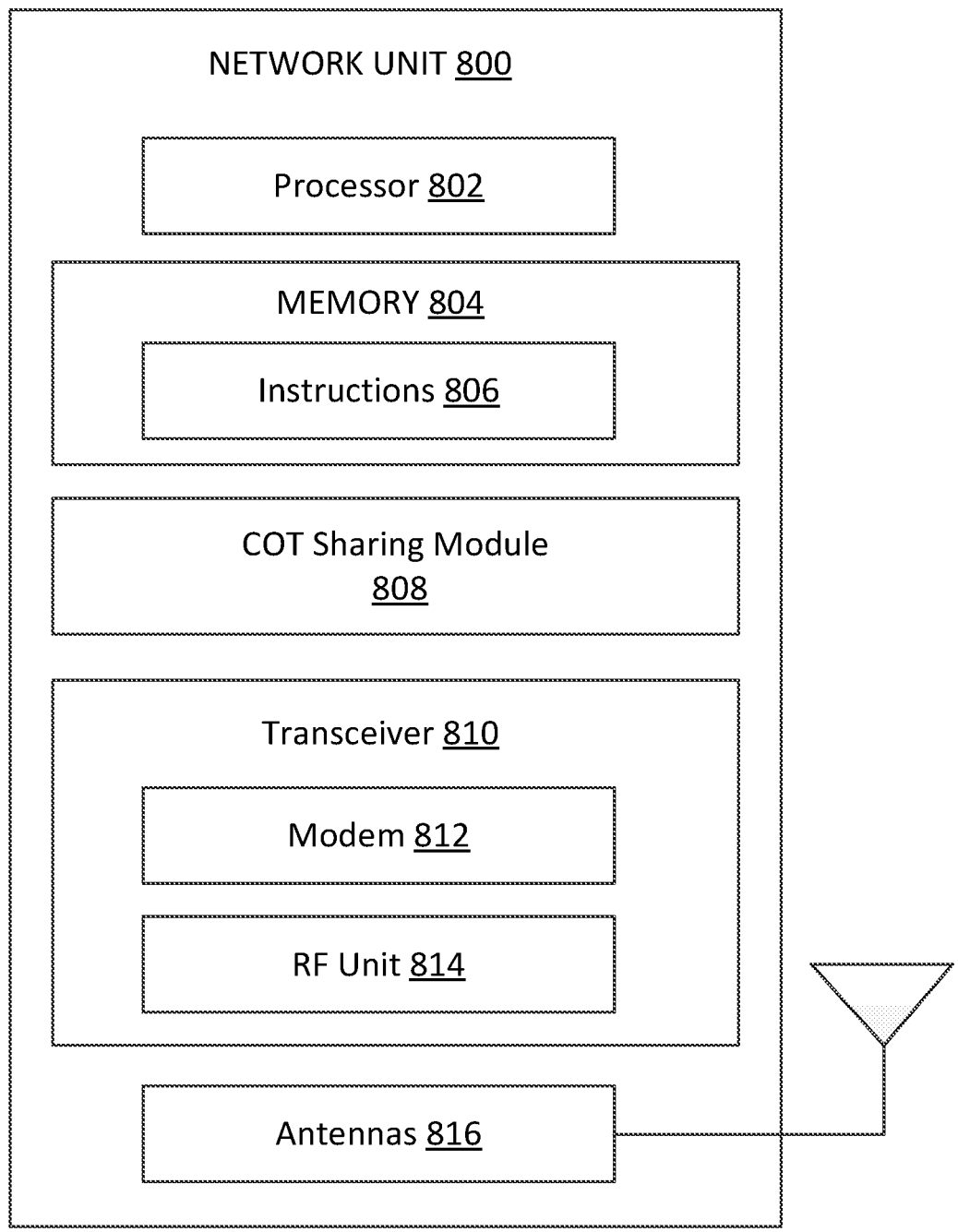
FIG. 8 is a block diagram of an exemplary network unit according to some aspects of the present disclosure.

FIG. 8 is a block diagram of an exemplary network unit 800 according to some aspects of the present disclosure. The network unit 800 may be a BS 105, the CU 210, the DU 230, or the RU 240, as discussed above. As shown, the network unit 800 may include a processor 802, a memory 804, a COT sharing module 808, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 3-6. Instructions 806 may also be referred to as code, which may be interpreted broadly to include any type of computer-readable statement(s).

The COT sharing module 808 may be implemented via hardware, software, or combinations thereof. For example, the COT sharing module 808 may be implemented as a processor, circuit, and/or instructions 806 stored in the memory 804 and executed by the processor 802.

In some aspects, the COT sharing module 808 may implement the aspects of FIGS. 3-6. For example, the COT sharing module 808 may receive, from a first UE (e.g., the UE 115, the UE 120, or the UE 700), a first indication associated with channel occupancy time (COT) sharing on sidelink communication. The COT sharing module 808 may receive, from a second UE (e.g., the UE 115, the UE 120, or the UE 700), a second indication associated with the COT sharing on sidelink communication. The COT sharing module 808 may transmit, to the first UE based on the first indication and the second indication, an indicator to initiate the COT on sidelink communication. The COT sharing module 808 may transmit, to the second UE based on the first indication and the second indication, an indicator to share the COT on sidelink communication.

Additionally or alternatively, the COT sharing module 808 can be implemented in any combination of hardware and software, and may, in some implementations, involve, for example, processor 802, memory 804, instructions 806, transceiver 810, and/or modem 812.

As shown, the transceiver 810 may include the modem subsystem 812 and the RF unit 814. The transceiver 810 can be configured to communicate bi-directionally with other devices, such as the UEs 115 and/or 600. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the network unit 800 to enable the network unit 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, a configuration indicating a plurality of sub-slots within a slot according to aspects of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

In some instances, the network unit 800 can include multiple transceivers 810 implementing different RATs (e.g., NR and LTE). In some instances, the network unit 800 can include a single transceiver 810 implementing multiple RATs (e.g., NR and LTE). In some instances, the transceiver 810 can include various components, where different combinations of components can implement RATs.

Figure 9:
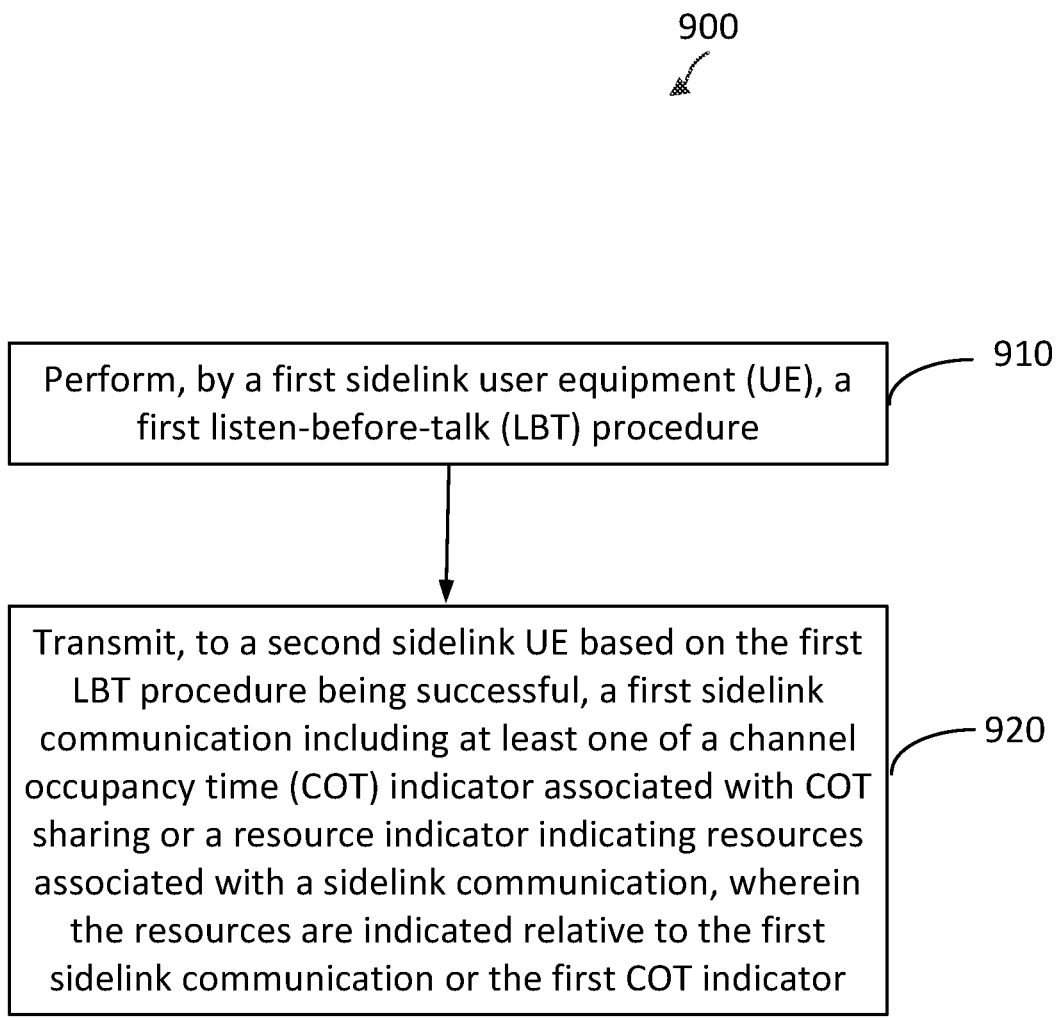
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the aspects. For example, a wireless communication device, such as the UE 115, the UE 120, or the UE 700, may utilize one or more components, such as the processor 702, the memory 704, the COT sharing module 708, the transceiver 710, the modem 712, and the one or more antennas 716, to execute aspects of method 900. The method 900 may employ similar mechanisms as in the networks 100 and 200 and the aspects and actions described with respect to FIGS. 3-6. As illustrated, the method 900 includes a number of enumerated aspects, but the method 900 may include additional aspects before, after, and in between the enumerated aspects. In some aspects, one or more of the enumerated aspects may be omitted or performed in a different order.

At action 910, the method 900 includes a first sidelink UE (e.g., the UE 115, the UE 120, or the UE 700) performing a first listen-before-talk (LBT) procedure. The first sidelink UE may perform the LBT procedure or other clear channel assessment (CCA) on one or more sidelink communication channels. In some instances, the first sidelink UE may perform an LBT procedure or other CCA to gain access to a channel occupancy time (COT) in an unlicensed (e.g., shared) frequency spectrum. For example, the first sidelink UE may perform a category 2 LBT, a category 3 LBT, and/or a category 4 LBT to gain access to the COT in an unlicensed frequency spectrum. In some aspects, the first sidelink UE may perform the LBT in one or more time resources, spatial resources, and/or frequency resources. The frequency resources may include a frequency spectrum, a frequency band, a frequency sub-band, a frequency subchannel, resource elements, resource blocks, and/or a frequency interlace. The time resources may include slot(s), sub-slot(s), symbol(s), subframe(s), or any other suitable time resources. In some aspects, the first sidelink UE may perform the LBT for one or more directional beams (e.g., a beam in the direction of the UE that the first sidelink UE intends to transmit a communication to and/or receive a communication from).

At action 920, the method 900 includes the first sidelink UE transmitting at least one of a resource indicator indicating resources associated with a sidelink communication or a channel occupancy time (COT) indicator associated with COT sharing. In this regard, the first sidelink UE may transmit the resource indicator and/or the COT indicator via SCI-1 on PSCCH, SCI-2 multiplexed with PSSCH, a MAC CE on PSSCH, or other suitable communication. In some aspects, the first sidelink UE may transmit the resource indicator and/or the COT indicator to sidelink UE(s) that the first sidelink UE intends to communicate with. The first sidelink UE may transmit the resource indicator and/or the COT indicator in the same communication (e.g., the same slot) as a PSSCH. The PSSCH may carry one or more transport blocks. Additionally or alternatively, the first sidelink UE may transmit the resource indicator and/or the COT indicator to other sidelink UEs that the first sidelink UE intends to share the COT with. For example, the first sidelink UE may intend to share the COT with other sidelink UEs in proximity to the first sidelink UE. In some aspects, the first sidelink UE may transmit the resource indicator and/or the COT indicator based on the LBT procedure at action 910 being successful.

In some aspects, the resource indicator transmitted by the first sidelink UE may indicate the resources associated with the sidelink communication relative to when the LBT procedure is successful. For example, if the first sidelink UE performs a successful LBT at slot i, then the resource indicator may indicate the resources associated with the sidelink communication relative to slot i. In some instances, the resource indicator may indicate the resources associated with the sidelink communication as a number (e.g., an integer number) of slots, a number of sub-slots, or a number of symbols from slot i (e.g., the end of slot i and/or the beginning of slot i). In some aspects, the resource indicator may indicate the resources associated with the sidelink communication as a time value (e.g., number of milliseconds) relative to slot i.

In some aspects, the COT indicator transmitted by the first sidelink UE may indicate a COT identifier (ID), the start of the COT, and/or the COT duration. In some aspects, a sidelink UE may receive one or more COT indicators from other sidelink UEs, including the first sidelink UE, indicating multiple COT identifiers. The COT identifier(s) may identify one or more COTs that the first sidelink UE may initiate and share with COT sharing sidelink UEs. The first sidelink UE may transmit the COT identifier(s) to the COT sharing UEs (e.g., a third sidelink UE, a fourth sidelink UE, etc.) via one or more sidelink communications (e.g., via SCI-1, SCI-2, MAC CE) after a successful LBT. The COT identifier may identify a COT that may be shared among sidelink UEs in proximity to one another. The location (e.g., a zone identity, a beam coverage pattern, a cell sector, a latitude/longitude range, a geofence, etc.) associated with the first sidelink UE and other COT sharing UEs may be used to determine aspects of COT sharing for the first sidelink UE and one or more of the other COT sharing UEs. In some aspects, the first sidelink UE may determine its location based on GPS coordinates, radio frequency triangulation, and/or other suitable method. Additionally or alternatively, the first sidelink UE may determine its location based on a zone identity associated with the first sidelink UE. In this regard, the first UE may determine its zone identity based on 3GPP TS 38.331, section 5.8.11 or other standard specification related to zone identity.

Additionally or alternatively, a network unit (e.g., the BS 105, the RU 240, the DU 230, the CU 210, and/or the network unit 800) may determine a COT identifier and/or a COT duration based on the location of the first sidelink UE and/or a location of one or more other COT sharing UEs in proximity to the first sidelink UE. For example, the network unit may determine whether the first sidelink UE may be configured as a COT initiating UE and/or a COT sharing UE based on the location of the first sidelink UE and/or a location of one or more other sidelink UEs in proximity to the first sidelink UE. The network unit may transmit the COT identifier and/or the COT duration to the first sidelink UE when the first sidelink UE is determined to be a COT initiator.

In some aspects, the COT indicator transmitted by the first sidelink UE may indicate a COT duration. The COT duration may indicate a time period for sidelink UEs to share the COT in which the first sidelink UE and the COT sharing UE(s) may communicate. The COT duration may start from a successful LBT by the first sidelink UE. In some aspects, the COT duration may be based on an amount of data (e.g., transport blocks) the first sidelink UE and/or the COT sharing UE(s) need to transmit. A larger amount of data may require a longer COT duration as compared to a smaller amount of data. The COT duration may be indicated to the COT sharing UE(s) as a number of slots, a number of sub-slots, a number of symbols, a number of milliseconds, or a combination thereof. In some aspects, the COT duration may be indicated as a remaining COT duration. For example, the COT duration may be a duration of x slots. The first sidelink UE may use y slots of the x slots to transmit sidelink communications. The remaining COT duration may be indicated to the second sidelink UE and/or other COT sharing sidelink UEs as x-y slots. In some aspects, the COT duration may be indicated as a COT extension. The first sidelink UE may initially indicate the COT duration as x slots. The first sidelink UE may subsequently indicate the COT duration as x+z slots. For example, the first sidelink UE may indicate the COT extension in a subsequent transmission (e.g., in a second, third or other subsequent transmission) as x+z slots. In some aspects, the COT may be extended based on a failed initial transmission (e.g., first sidelink UE receives a NACK from a second sidelink UE) requiring a retransmission.

In some aspects, the starting point of the COT (e.g. a starting slot, starting sub-slot, and/or starting symbol) may be based on the first sidelink UE performing a successful LBT at action 910. For example, the first sidelink UE may have resources reserved in slot (i), slot (i+1), slot (i+2), etc. The resources may be a set of resources of a resource pool. The set(s) of resources may each include a number of slots (e.g., contiguous slots), a number of sub-slots (e.g., contiguous sub-slots), and/or a number of symbols (e.g., contiguous symbols).

In some aspects, the first sidelink UE may receive an indication of a resource pool from a network unit indicating resources reserved for the first sidelink UE. Slot (i), slot (i+1), slot (i+2), etc. may be contiguous or non-contiguous in time. The first sidelink UE may perform an LBT before slot (i) in order to gain access to the COT during slot (i). If the LBT is unsuccessful, then the first sidelink UE may wait a period of time (e.g., a backoff time period) to perform another LBT. For example, the first sidelink UE may wait until an offset from the next slot boundary between slot (i) and slot (i+1) to perform another LBT. If the subsequent LBT is successful, then the first sidelink UE may gain the COT starting at slot (i+1). When the LBT is successful, the first sidelink UE may transmit the resource indicator and/or the COT indicator to the second sidelink UE and other COT sharing UEs. For example, if the LBT is successful at slot (i+1), the COT indicator may indicate the COT begins at slot (i+1). The other COT sharing UEs will share the COT in resources relative to slot (i+1). For example, when the first sidelink UE gains the COT at slot (i+1), the first sidelink UE may transmit (e.g., via SCI) the resource indicator and/or the COT indicator to other COT sharing UEs in slot (i+1). One of the other COT sharing UEs (e.g., a third sidelink UE) may transmit a sidelink communication in the next slot (i+2). The third sidelink UE may transmit the sidelink communication in slot (i+2) after a successful LBT (e.g., a reduced category LBT such as Cat 2 LBT). If the first sidelink UE requires additional slots for sidelink communication (e.g., 2 or more slots for an initial communication), the first sidelink UE may transmit in slots (i+1), (i+2), (i+x). The third sidelink UE may transmit after the first sidelink UE in slot (i+x+2).

The resource allocation transmitted by the first sidelink UE may indicate reserved resources that the first sidelink UE may use to transmit and/or retransmit sidelink communications. In some instances, the resource allocation may indicate time resources (e.g., slots, sub-slots, and/or symbols) for the first sidelink UE to transmit relative to when the first sidelink UE performs a successful LBT. In some aspects, the first sidelink UE may be allocated one or more sets of resources (e.g., a number of contiguous slots). For example, the first sidelink UE may have a first set of resources allocated for an initial sidelink transmission, a second set of resources allocated for transmission or retransmission, and a third set of resources allocated for transmission or retransmission. The second set of resources may be indicated as x slots after the first set of resources. The third set of resources may be indicated as y slots after the first set of resources. In some aspects, x may be the same or different from y. In some aspects, y may be greater than x.

In some aspects, the time gap (e.g., x slots) between a first resource of the first set of resources and the first resource of the second set of resources may be based on the time required for the receiving sidelink UE to process a received transmission and generate/transmit an associated HARQ feedback and/or the time required for the first sidelink UE to receive and process the HARQ feedback and generate/transmit a retransmission (e.g., based on the HARQ feedback being a NACK). Similarly, the time gap (e.g., y slots) between a first resource of the first set of resources and the first resource of the third set of resources may be based on the time required for the receiving sidelink UE to process a received transmission and generate/transmit an associated HARQ feedback and/or the time required for the first sidelink UE to receive and process the HARQ feedback and generate/transmit a second retransmission (e.g., based on the HARQ feedback being a second NACK). The sidelink UE receiving the transmission from the first sidelink UE may transmit the HARQ feedback to the first sidelink UE in resources relative to the transmission by the first sidelink UE. For example, if the first sidelink UE performs a successful LBT just prior to slot (i+1) and transmits the communication in slot (i+1), the receiving sidelink UE may transmit the HARQ feedback in slot (i+1+n), where n is the number of slots relative to the transmission in slot (i+1).

At action 930, the method 900 includes the first sidelink UE transmitting the sidelink communication (e.g., one or more transport blocks) during the COT to the second sidelink UE based on the first LBT procedure being successful. In this regard, the first sidelink UE may transmit a sidelink communication to the second sidelink UE via SCI-1, SCI-2, MAC CE, or other suitable communication.

The first sidelink UE may perform an LBT prior (e.g., immediately before) the resources allocated to the first sidelink UE in an effort to gain access to the COT. If the LBT is successful, then the first sidelink UE may transmit the sidelink communication during the COT to the second sidelink UE. If the LBT is unsuccessful, then the first sidelink UE may wait a period of time (e.g., backoff time period) to perform another LBT. For example, the first sidelink UE may wait until an offset from the next slot boundary, sub-slot boundary, or symbol boundary to perform another LBT. If the subsequent LBT is successful, then the first sidelink UE may gain the COT starting at the slot boundary, sub-slot boundary, or symbol boundary and transmit the sidelink communication during the COT to the second sidelink UE. The sidelink communication may include SCI indicating the COT duration, COT ID, and/or resources relative to the start of the COT (e.g., the successful LBT).

Figure 10:
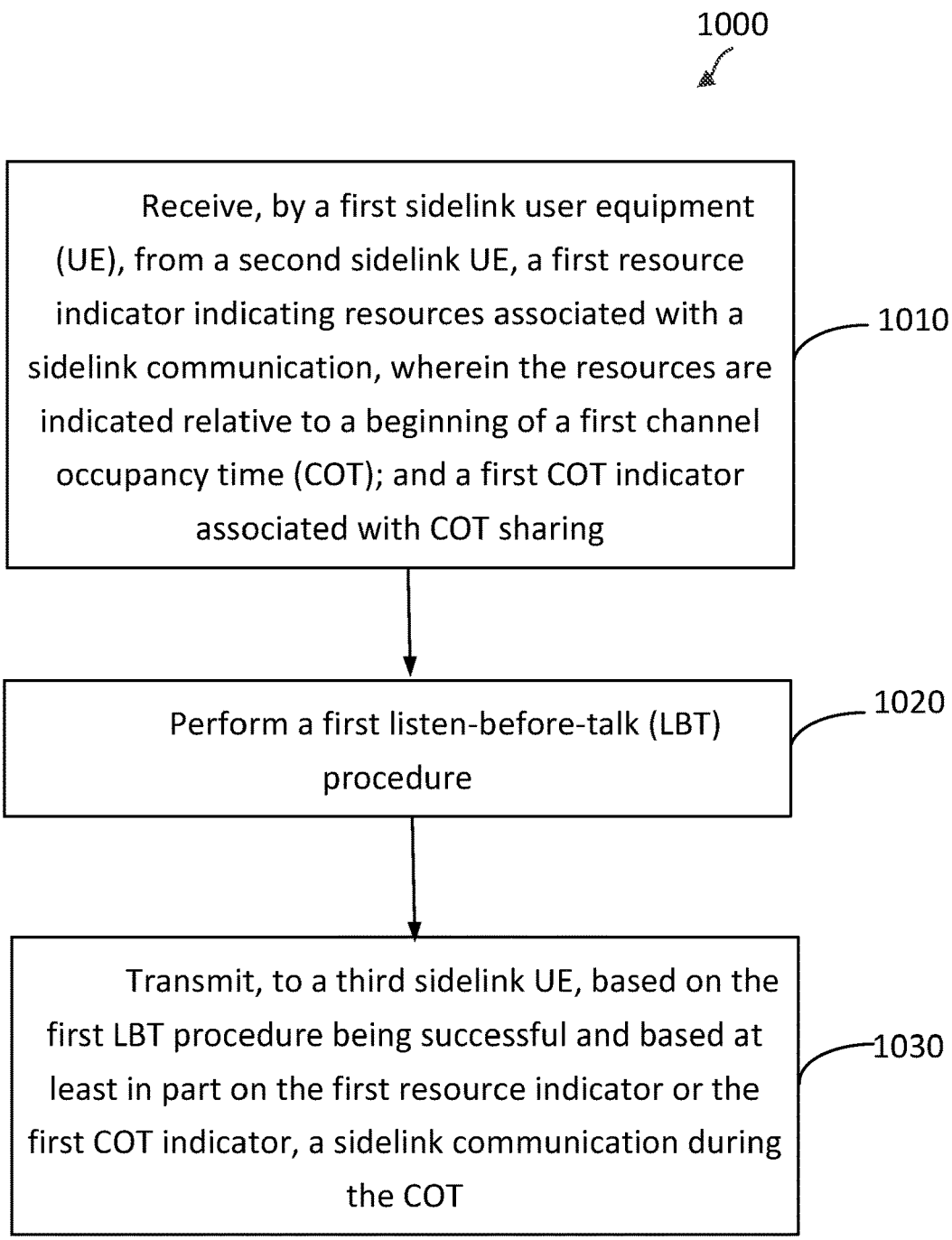
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the aspects. For example, a wireless communication device, such as the UE 115, the UE 120, or the UE 700, may utilize one or more components, such as the processor 702, the memory 704, the COT sharing module 708, the transceiver 710, the modem 712, and the one or more antennas 716, to execute aspects of method 1000. The method 1000 may employ similar mechanisms as in the networks 100 and 200 and the aspects and actions described with respect to FIGS. 3-6. As illustrated, the method 1000 includes a number of enumerated aspects, but the method 1000 may include additional aspects before, after, and in between the enumerated aspects. In some aspects, one or more of the enumerated aspects may be omitted or performed in a different order.

At action 1010, the method 1000 includes a first sidelink UE (e.g., the UE 115, the UE 120, or the UE 700) receiving from a second sidelink UE at least one of a resource indicator indicating resources associated with a sidelink communication or a channel occupancy time (COT) indicator associated with COT sharing. In this regard, the first sidelink UE may receive the resource indicator and/or the COT indicator via SCI-1, SCI-2, MAC CE, or other suitable communication. In some aspects, the first sidelink UE may receive the resource indicator and/or the COT indicator from a second sidelink UE that the first sidelink UE intends to communicate with. Additionally or alternatively, the first sidelink UE may receive the resource indicator and/or the COT indicator from other sidelink UEs that the first sidelink UE intends to share the COT with. For example, the first sidelink UE may intend to share the COT with other sidelink UEs in proximity to the first sidelink UE.

In some aspects, the resource indicator received by the first sidelink UE may indicate the resources associated with the sidelink communication relative to when an LBT procedure performed by the second sidelink UE is successful. For example, if the second sidelink UE performs a successful LBT at slot i, then the resource indicator may indicate the resources associated with the sidelink communication relative to slot i. In some instances, the resource indicator may indicate the resources associated with the sidelink communication as a number (e.g., an integer number) of slots, a number of sub-slots, or a number of symbols from slot i (e.g., the end of slot i and/or the beginning of slot i). In some aspects, the resource indicator may indicate the resources associated with the sidelink communication as a time value (e.g., number of milliseconds) relative to slot i.

In some aspects, the COT indicator received by the first sidelink UE may indicate a COT identifier (ID), the start of the COT, and/or the COT duration. In some aspects, a sidelink UE may receive one or more COT indicators from other sidelink UEs, including the second sidelink UE, indicating multiple COT identifiers. The COT identifier(s) may identify one or more COTs that the second sidelink UE may initiate and share with COT sharing sidelink UEs. The first sidelink UE may receive the COT identifier(s) from the COT sharing UEs (e.g., a third sidelink UE, a fourth sidelink UE, etc.) via one or more sidelink communications (e.g., via SCI-1, SCI-2, MAC CE) after a successful LBT. The COT identifier may identify a COT that may be shared among sidelink UEs in proximity to one another. The location (e.g., a zone identity, a beam coverage pattern, a cell sector, a latitude/longitude range, a geofence, etc.) associated with the first sidelink UE and other COT sharing UEs may be used to determine aspects of COT sharing for the first sidelink UE and one or more of the other COT sharing UEs. In some aspects, the first sidelink UE may determine its location based on GPS coordinates, radio frequency triangulation, and/or other suitable method. Additionally or alternatively, the first sidelink UE may determine its location based on a zone identity associated with the first sidelink UE. In this regard, the first UE may determine its zone identity based on 3GPP TS 38.331, section 5.8.11 or other standard specification related to zone identity.

Additionally or alternatively, a network unit (e.g., the BS 105, the RU 240, the DU 230, the CU 210, and/or the network unit 800) may determine a COT identifier and/or a COT duration based on the location of the first sidelink UE and/or a location of one or more other COT sharing UEs in proximity to the first sidelink UE. For example, the network unit may determine whether the first sidelink UE may be configured as a COT initiating UE and/or a COT sharing UE based on the location of the first sidelink UE and/or a location of one or more other sidelink UEs in proximity to the first sidelink UE. The network unit may transmit the COT identifier and/or the COT duration to the first sidelink UE when the first sidelink UE is determined to be a COT initiator.

In some aspects, the COT indicator receive by the first sidelink UE may indicate a COT duration. The COT duration may indicate a time period for sidelink UEs to share the COT in which the first sidelink UE and the COT sharing UE(s) may communicate. The COT duration may start from a successful LBT by the second sidelink UE. In some aspects, the COT duration may be based on an amount of data (e.g., transport blocks) the first sidelink UE and/or the COT sharing UE(s) need to transmit. A larger amount of data may require a longer COT duration as compared to a smaller amount of data. The COT duration may be indicated to the COT sharing UE(s) as a number of slots, a number of sub-slots, a number of symbols, a number of milliseconds, or a combination thereof. In some aspects, the COT duration may be indicated as a remaining COT duration. For example, the COT duration may be a duration of x slots. The second sidelink UE may use y slots of the x slots to transmit sidelink communications. The remaining COT duration may be indicated to the first sidelink UE and/or other COT sharing sidelink UEs as x-y slots. In some aspects, the COT duration may be indicated as a COT extension. The second sidelink UE may initially indicate the COT duration as x slots. The second sidelink UE may subsequently indicate the COT duration as x+z slots. For example, the second sidelink UE may indicate the COT extension in a subsequent transmission (e.g., in a second, third or other subsequent transmission) as x+z slots. In some aspects, the COT may be extended based on a failed initial transmission (e.g., second sidelink UE receives a NACK from a third sidelink UE) requiring a retransmission.

In some aspects, the starting point of the COT (e.g. a starting slot, starting sub-slot, and/or starting symbol) may be based on the second sidelink UE performing a successful LBT. For example, the second sidelink UE may have resources reserved in slot (i), slot (i+1), slot (i+2), etc. The resources may be a set of resources of a resource pool. The set(s) of resources may each include a number of slots (e.g., contiguous slots), a number of sub-slots (e.g., contiguous sub-slots), and/or a number of symbols (e.g., contiguous symbols).

In some aspects, the second sidelink UE may receive an indication of a resource pool from a network unit indicating resources reserved for the first sidelink UE. Slot (i), slot (i+1), slot (i+2), etc. may be contiguous or non-contiguous in time. The second sidelink UE may perform an LBT before slot (i) in order to gain access to the COT during slot (i). If the LBT is unsuccessful, then the second sidelink UE may wait a period of time (e.g., a backoff time period) to perform another LBT. For example, the second sidelink UE may wait until an offset from the next slot boundary between slot (i) and slot (i+1) to perform another LBT. If the subsequent LBT is successful, then the second sidelink UE may gain the COT starting at slot (i+1). When the LBT is successful, the second sidelink UE may transmit the resource indicator and/or the COT indicator to the first sidelink UE and other COT sharing UEs. For example, if the LBT is successful at slot (i+1), the COT indicator may indicate the COT begins at slot (i+1). The first sidelink UE and other COT sharing UEs will share the COT in resources relative to slot (i+1). For example, when the second sidelink UE gains the COT at slot (i+1), the second sidelink UE may transmit (e.g., via SCI) the resource indicator and/or the COT indicator to the first sidelink UE and other COT sharing UEs in slot (i+1). The first sidelink UE may transmit a sidelink communication in the next slot (i+2). The first sidelink UE may transmit the sidelink communication in slot (i+2) after a successful LBT (e.g., a reduced category LBT such as Cat 2 LBT). If the second sidelink UE requires additional slots for sidelink communication (e.g., 2 or more slots for an initial communication), the second sidelink UE may transmit in slots (i+1), (i+2), (i+x). The first sidelink UE may share the COT and transmit after the second sidelink UE beginning in slot (i+x+2).

The resource allocation received by the first sidelink UE may indicate reserved resources that the first sidelink UE may use to transmit and/or retransmit sidelink communications. In some instances, the resource allocation may indicate time resources (e.g., slots, sub-slots, and/or symbols) for the first sidelink UE to transmit relative to when the second sidelink UE performs a successful LBT. In some aspects, the first sidelink UE may be allocated one or more sets of resources (e.g., a number of contiguous slots). For example, the first sidelink UE may have a first set of resources allocated for an initial sidelink transmission, a second set of resources allocated for transmission or retransmission, and a third set of resources allocated for transmission or retransmission. The second set of resources may be indicated as x slots after the first set of resources. The third set of resources may be indicated as y slots after the first set of resources. In some aspects, x may be the same or different from y. In some aspects, y may be greater than x.

In some aspects, the time gap (e.g., x slots) between a first resource of the first set of resources and the first resource of the second set of resources may be based on the time required for the receiving sidelink UE to process a received transmission and generate/transmit an associated HARQ feedback and/or the time required for the first sidelink UE to receive and process the HARQ feedback and generate/transmit a retransmission (e.g., based on the HARQ feedback being a NACK). Similarly, the time gap (e.g., y slots) between a first resource of the first set of resources and the first resource of the third set of resources may be based on the time required for the receiving sidelink UE to process a received transmission and generate/transmit an associated HARQ feedback and/or the time required for the first sidelink UE to receive and process the HARQ feedback and generate/transmit a second retransmission (e.g., based on the HARQ feedback being a second NACK). The sidelink UE receiving the transmission from the first sidelink UE may transmit the HARQ feedback to the first sidelink UE in resources relative to the transmission by the first sidelink UE. For example, if the first sidelink UE performs a successful LBT (e.g., CAT 2 LBT) just prior to slot (i+2) and transmits the communication in slot (i+2), the receiving sidelink UE may transmit the HARQ feedback in slot (i+2+n), where n is the number of slots relative to the transmission in slot (i+2).

At action 1020, the method 1000 includes a first sidelink UE (e.g., the UE 115, the UE 120, or the UE 700) performing a listen-before-talk (LBT) procedure. The first sidelink UE may perform the LBT procedure or other clear channel assessment (CCA) on one or more sidelink communication channels. In some instances, the first sidelink UE may perform an LBT procedure or other CCA to gain access to a channel occupancy time (COT) in an unlicensed (e.g., shared) frequency spectrum after receiving the resource indicator and/or COT indicator from the second sidelink UE. In this way the first sidelink UE shares the COT with the second sidelink UE and other COT sharing sidelink UEs. For example, the first sidelink UE may perform a category 2 LBT, a category 3 LBT, and/or a category 4 LBT to gain access to the COT in an unlicensed frequency spectrum. In some aspects, the first sidelink UE may perform the LBT in one or more time resources, spatial resources, and/or frequency resources. The frequency resources may include a frequency spectrum, a frequency band, a frequency sub-band, a frequency subchannel, resource elements, resource blocks, and/or a frequency interlace. The time resources may include slot(s), sub-slot(s), symbol(s), subframe(s), or any other suitable time resources. In some aspects, the first sidelink UE may perform the LBT for one or more directional beams (e.g., a beam in the direction of the UE that the first sidelink UE intends to transmit a communication to and/or receive a communication from).

At action 1030, the method 1000 includes the first sidelink UE transmitting the sidelink communication (e.g., one or more transport blocks) during the COT to a third sidelink UE based on the LBT procedure at action 1020 being successful. In this regard, the first sidelink UE may transmit a sidelink communication to the third sidelink UE via SCI-1, SCI-2, MAC CE, or other suitable communication. The first sidelink UE may transmit the sidelink communication during the COT to the third sidelink UE based on the resource indicator and/or the COT indicator received from the second sidelink UE at action 1010.

Further aspects of the present disclosure include the following:

Aspect 1 includes a method of wireless communication performed by a first sidelink user equipment (UE), the method comprising performing a first listen-before-talk (LBT) procedure; transmitting, to a second sidelink UE based on the LBT procedure being successful, at least one of a resource indicator indicating resources associated with a sidelink communication, wherein the resources are indicated relative to when the first LBT procedure is successful; or a channel occupancy time (COT) indicator associated with COT sharing Aspect 2 includes the method of aspect 1, wherein the transmitting the at least one of the resource indicator or the COT indicator comprises transmitting the resource indicator, wherein the resource indicator indicates the resources as an integer number of slots relative to when the LBT procedure is successful.

Aspect 3 includes the method of any of aspects 1-2, wherein the transmitting the at least one of the resource indicator or the COT indicator comprises transmitting the at least one of the resource indicator or the COT indicator via sidelink control information (SCI).

Aspect 4 includes the method of any of aspects 1-3, wherein the transmitting the at least one of the resource indicator or the COT indicator comprises transmitting the resource indicator, wherein the resource indicator further indicates a minimum time gap between the resources associated with the sidelink communication.

Aspect 5 includes the method of any of aspects 1-4, wherein the transmitting the at least one of the resource indicator or the COT indicator comprises transmitting the resource indicator, wherein the resources associated with the sidelink communication comprises resources reserved for transmission of the sidelink communication during the COT.

Aspect 6 includes the method of any of aspects 1-5, further comprising performing, in a first resource, a second LBT procedure before the first LBT procedure; and wherein the transmitting the at least one of the resource indicator or the COT indicator comprises transmitting, based on the second LBT procedure being unsuccessful, the at least one of the resource indicator or the COT indicator in a second resource different than the first resource.

Aspect 7 includes the method of any of aspects 1-6, wherein the transmitting the at least one of the resource indicator or the COT indicator comprises transmitting the resource indicator; and further comprising receiving, from the second sidelink UE in the resources relative to when the first LBT procedure is successful, an acknowledgement/negative acknowledgement (ACK/NACK) associated with the sidelink communication.

Aspect 8 includes the method of any of aspects 1-7, further comprising transmitting, to a third sidelink UE based on the first LBT procedure being successful, at least one of the resources indicator indicating the resources associated with the sidelink communication; or the COT indicator associated with COT sharing.

Aspect 9 includes the method of any of aspects 1-8, wherein the COT indicator further indicates to the third sidelink UE to share the COT based at least in part on the indicated resources; and the COT indicator further indicates a COT duration.

Aspect 10 includes the method of any of aspects 1-9, wherein the COT duration indicates a time period for sharing the COT among sidelink UEs within a proximity of the first sidelink UE; and the COT duration is based at least in part on a number of the sidelink UEs within the proximity of the first sidelink UE.

Aspect 11 includes a method of wireless communication performed by a first sidelink user equipment (UE), the method comprising receiving, from a second sidelink UE a first resource indicator indicating resources associated with a sidelink communication, wherein the resources are indicated relative to a beginning of a first channel occupancy time (COT); the first COT indicator associated with COT sharing; performing a first listen-before-talk (LBT) procedure; and transmitting, to a third sidelink UE based on the first LBT procedure being successful and based at least in part on the received resource indicator or the COT indicator, a sidelink communication during the COT.

Aspect 12 includes the method of aspect 11, wherein the resource indicator indicates the resources as an integer number of slots relative to the beginning of the COT.

Aspect 13 includes the method of any of aspects 11-12, wherein the receiving the resource indicator and the COT indicator comprises receiving the resource indicator and the COT indicator via sidelink control information (SCI).

Aspect 14 includes the method of any of aspects 11-13, wherein the resource indicator further indicates a minimum time gap between the resources associated with the sidelink communication.

Aspect 15 includes the method of any of aspects 11-14, wherein the resources associated with the sidelink communication comprises resources reserved for retransmission of the sidelink communication during the COT.

Aspect 16 includes the method of any of aspects 11-15, further comprising receiving, from the third sidelink UE in the resources relative to when the first LBT procedure is successful, an acknowledgement/negative acknowledgement (ACK/NACK) associated with the sidelink communication.

Aspect 17 includes the method of any of aspects 11-16, wherein the COT indicator further indicates to share the COT using the indicated resources; and the COT indicator further indicates a COT duration.

Aspect 18 includes the method of any of aspects 11-17, wherein the COT duration indicates a time period for sharing the COT among sidelink UEs within a proximity of the first sidelink UE.

Aspect 19 includes the method of any of aspects 11-18, further comprising transmitting, to the second and/or the third sidelink UE, based on the first LBT procedure being successful: a second resource indicator indicating resources associated with the sidelink communication, wherein the resources are indicated relative to the beginning of the first channel occupancy time (COT); and the second COT indicator associated with COT sharing.

Aspect 20 includes the method of any of aspects 11-19, wherein the second COT indicator further indicates the COT identifier as indicated in the first COT indicator.

Aspect 21 includes the method of any of aspects 11-20, wherein the second COT indicator further indicates the COT duration as the COT duration indicated in the first COT indicator; a remaining COT duration based at least in part on the COT duration indicated in the first COT indicator; or a COT duration including the extension to the COT duration indicated in the first COT indicator Aspect 22 includes the method of any of aspects 11-18, wherein the COT indicator further indicates to share the COT using the indicated resources; and the COT indicator further indicates a COT identifier.

Aspect 23 includes a non-transitory computer-readable medium storing one or more instructions for wireless communication, the one or more instructions comprising one or more instructions that, when executed by one or more processors of a first sidelink UE, cause the first sidelink UE to perform any one of aspects 1-10.

Aspect 24 includes a non-transitory computer-readable medium storing one or more instructions for wireless communication, the one or more instructions comprising one or more instructions that, when executed by one or more processors of a first sidelink UE cause the first sidelink UE to perform any one of aspects 11-22.

Aspect 25 includes a first sidelink user equipment (UE) comprising one or more means to perform any one or more of aspects 1-10.

Aspect 26 includes a first sidelink UE comprising one or more means to perform any one or more of aspects 11-22.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), the method comprising:
    performing a first listen-before-talk (LBT) procedure; and
    transmitting, to a second sidelink UE based on the first LBT procedure being successful:
        a resource indicator indicating resources associated with a sidelink communication, wherein the resource indicator indicates the resources as an integer number of slots relative to when the LBT procedure is successful; and
        a channel occupancy time (COT) indicator associated with COT sharing.

2. The method of claim 1,
    wherein the transmitting the resource indicator and the COT indicator comprises transmitting the resource indicator, wherein the resources associated with the sidelink communication comprises resources reserved for transmission of the sidelink communication during a COT.

3. The method of claim 1, further comprising:
    performing, in a first resource, a second LBT procedure before the first LBT procedure; and
    wherein the transmitting the resource indicator and the COT indicator comprises transmitting, based on the second LBT procedure being unsuccessful, the resource indicator or the COT indicator in a second resource different than the first resource.

4. The method of claim 1,
    wherein the transmitting the resource indicator and the COT indicator comprises transmitting the resource indicator; and
    further comprising:
        receiving, from the second sidelink UE in the resource relative to when the first LBT procedure is successful, an acknowledgement/negative acknowledgement (ACK/NACK) associated with the sidelink communication.

5. The method of claim 1, further comprising:
    transmitting, to a third sidelink UE based on the first LBT procedure being successful, at least one of:
        the resource indicator indicating the resources associated with the sidelink communication; or
        the COT indicator associated with COT sharing.

6. The method of claim 5, wherein:
    the COT indicator further indicates to the third sidelink UE to share a COT based at least in part on the indicated resources; and
    the COT indicator further indicates a COT identifier.

7. The method of claim 5 wherein:
    the COT indicator further indicates to the third sidelink UE to share the COT based at least in part on the indicated resources; and
    the COT indicator further indicates a COT duration.

8. The method of claim 7, wherein:
    the COT duration indicates a time period for sharing the COT among sidelink UEs within a proximity of the first sidelink UE.

9. A method of wireless communication performed by a first sidelink user equipment (UE), the method comprising:
    receiving, from a second sidelink UE:
        a first resource indicator indicating resources associated with a sidelink communication, wherein the resource indicator indicates the resources as an integer number of slots relative to when a second listen-before-talk (LBT) procedure performed by the second sidelink UE is successful; and a first channel occupancy time (COT) indicator associated with COT sharing;

performing a first LBT procedure; and transmitting, to a third sidelink UE, based on the first LBT procedure being successful and based at least in part on the first resource indicator or the first COT indicator, a sidelink communication during a first COT.

10. The method of claim 9,
wherein the first resource indicator indicates the resources as an integer number of slots relative to a beginning of the first COT.

11. The method of claim 9,
wherein the receiving the first resource indicator and the first COT indicator comprises receiving the first resource indicator and the first COT indicator via sidelink control information (SCI).

12. The method of claim 9,
wherein the resources associated with the sidelink communication comprises resources reserved for transmission of the sidelink communication during the first COT.

13. The method of claim 9, further comprising:
receiving, from the third sidelink UE in the resource relative to when the first LBT procedure is successful, an acknowledgement/negative acknowledgement (ACK/NACK) associated with the sidelink communication.

14. The method of claim 9, wherein:
the first COT indicator further indicates to share the first COT using the indicated resources; and
the first COT indicator further indicates a COT identifier.

15. A first sidelink user equipment (UE) comprising:
a memory;
a transceiver; and
at least one processor coupled to the memory and the transceiver, wherein the first sidelink UE is configured to:
perform a first listen-before-talk (LBT) procedure; and
transmit, to a second sidelink UE based on the first LBT procedure being successful:
a resource indicator indicating resources associated with a sidelink communication, wherein the resource indicator indicates the resources as an integer number of slots relative to when the first LBT procedure is successful; and
a channel occupancy time (COT) indicator associated with COT sharing.

16. The method of claim 12, wherein:
the COT indicator further indicates to the third sidelink UE to share a COT based at least in part on the indicated resources; and
the COT indicator further indicates a COT duration.

17. The method of claim 16, wherein:
the COT duration indicates a time period for sharing the COT among sidelink UEs within a proximity of the first sidelink UE.

18. The first sidelink UE of claim 15,
wherein the first sidelink UE is further configured to:
transmit the resource indicator, wherein the resources associated with the sidelink communication comprises resources reserved for transmission of the sidelink communication during a COT.

19. The first sidelink UE of claim 15,
wherein the first sidelink UE is further configured to:
perform, in a first resource, a second LBT procedure before the first LBT procedure; and
transmit, based on the second LBT procedure being unsuccessful, the resource indicator or the COT indicator in a second resource different than the first resource.

20. The first sidelink UE of claim 15,
wherein the first sidelink UE is further configured to:
transmit the resource indicator; and
receive, from the second sidelink UE in the resource relative to when the first LBT procedure is successful, an acknowledgement/negative acknowledgement (ACK/NACK) associated with the sidelink communication.

21. The first sidelink UE of claim 15,
wherein the first sidelink UE is further configured to:
transmit, to a third sidelink UE based on the first LBT procedure being successful, at least one of:
the resource indicator indicating the resources associated with the sidelink communication; or
the COT indicator associated with COT sharing.

22. The first sidelink UE of claim 21, wherein:
the COT indicator further indicates to the third sidelink UE to share a COT based at least in part on the indicated resources; and
the COT indicator further indicates a COT identifier.

23. The first sidelink UE of claim 21 wherein:
the COT indicator further indicates to the third sidelink UE to share the COT based at least in part on the indicated resources; and
the COT indicator further indicates a COT duration.

24. The first sidelink UE of claim 23, wherein:
the COT duration indicates a time period for sharing the COT among sidelink UEs within a proximity of the first sidelink UE.

25. A first sidelink user equipment (UE) comprising:
a memory;
a transceiver; and
at least one processor coupled to the memory and the transceiver, wherein the first sidelink UE is configured to:
receive, from a second sidelink UE:
a first resource indicator indicating resources associated with a sidelink communication, wherein the resource indicator indicates the resources as an integer number of slots relative to when a second listen-before-talk (LBT) procedure performed by the second sidelink UE is successful; and
a first channel occupancy time (COT) indicator associated with COT sharing;
perform a first LBT procedure; and
transmit, to a third sidelink UE, based on the first LBT procedure being successful and based at least in part on the first resource indicator or the first COT indicator, a sidelink communication during a first COT.

26. The first sidelink UE of claim 25, wherein the resource indicator indicates the resources as an integer number of slots relative to a beginning of the first COT.

27. The first sidelink UE of claim 25,
wherein the first sidelink UE is further configured to:
receive the first resource indicator and the first COT indicator via sidelink control information (SCI).

28. The first sidelink UE of claim 25,
wherein the resources associated with the sidelink communication comprises resources reserved for transmission of the sidelink communication during the first COT.

29. The first sidelink UE of claim 25,
wherein the first sidelink UE is further configured to:
   receive, from the third sidelink UE in the resource relative to when the first LBT procedure is successful, an acknowledgement/negative acknowledgement (ACK/NACK) associated with the sidelink communication.

30. The first sidelink UE of claim 25, wherein:
the first COT indicator further indicates to share the first COT using the indicated resources; and
the first COT indicator further indicates a COT identifier.

* * * * *